United States Patent [19]
Udd et al.

[11] Patent Number: 5,380,995
[45] Date of Patent: Jan. 10, 1995

[54] FIBER OPTIC GRATING SENSOR SYSTEMS FOR SENSING ENVIRONMENTAL EFFECTS

[75] Inventors: Eric Udd, Huntington Beach; Timothy E. Clark, Santa Ana, both of Calif.

[73] Assignee: McDonnell Douglas Corporation, Huntington Beach, Calif.

[21] Appl. No.: 963,687

[22] Filed: Oct. 20, 1992

[51] Int. Cl.[6] .................................. G01B 9/02
[52] U.S. Cl. ........................ 250/227.18; 356/345
[58] Field of Search ............ 250/227.18, 227.23, 250/227.21, 227.16, 227.14, 227.19; 356/345

[56] References Cited

U.S. PATENT DOCUMENTS

| | | | |
|---|---|---|---|
| 4,712,004 | 12/1987 | Spillman, Jr. | 250/227.23 |
| 4,874,941 | 10/1989 | Spillman, Jr. | 250/226 |
| 5,046,848 | 9/1991 | Udd | 356/345 |
| 5,177,805 | 1/1993 | Groger et al. | 385/12 |

Primary Examiner—David C. Nelms
Assistant Examiner—Stephone B. Allen
Attorney, Agent, or Firm—Pillsbury Madison & Sutro

[57] ABSTRACT

One or more optical fiber gratings are used to sense environmental effects that can vary the spacing between the lines of the grating to vary the center frequency of the spectral envelope, either reflected or passed thereby. Light of the sensor grating's spectral envelope is transmitted to a local grating unaffected by the environmental effect and compared with the spectral envelope of the local grating to produce an intensity modulated signal, which is detected to sense the environmental effect. The sensor systems so constructed may have one or more local gratings and those local gratings may be modulated to reduce the effects of noise, broaden the dynamic range, vary the sensitivity or discriminate in a multiplexed embodiment. The system can be operated either open or closed loop.

74 Claims, 13 Drawing Sheets

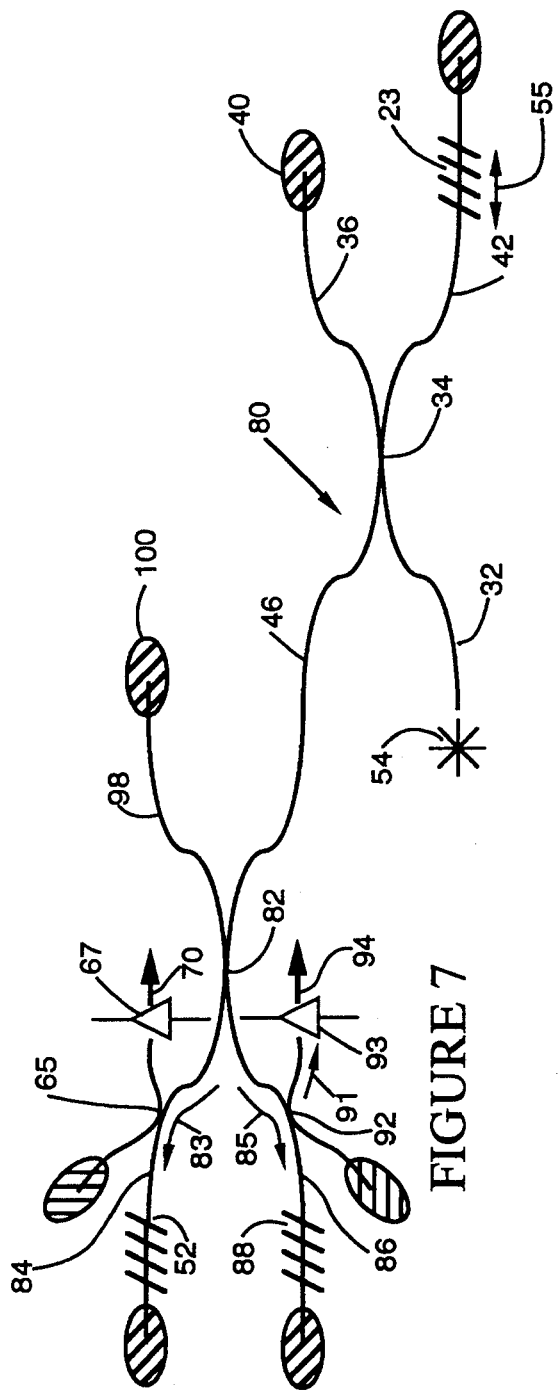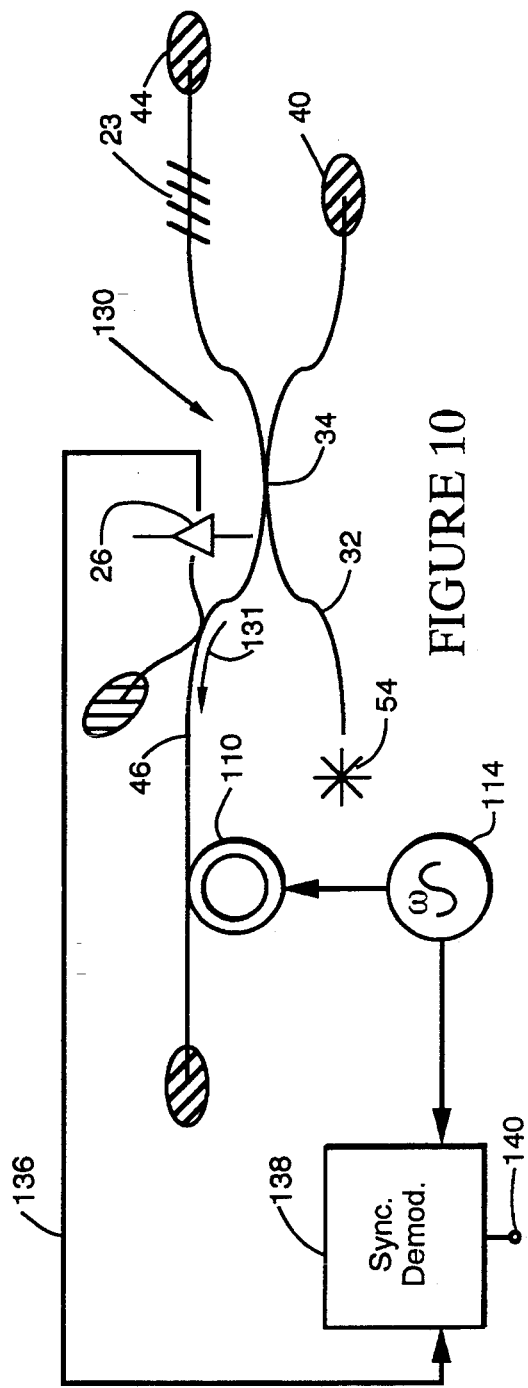

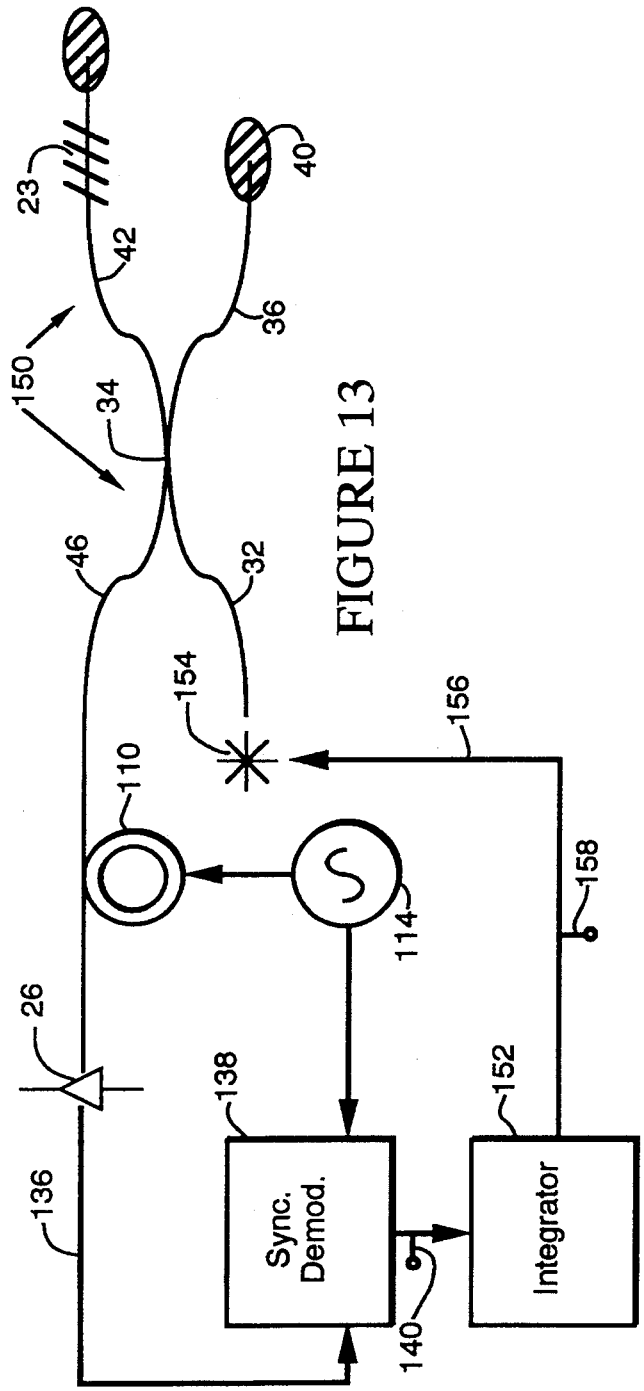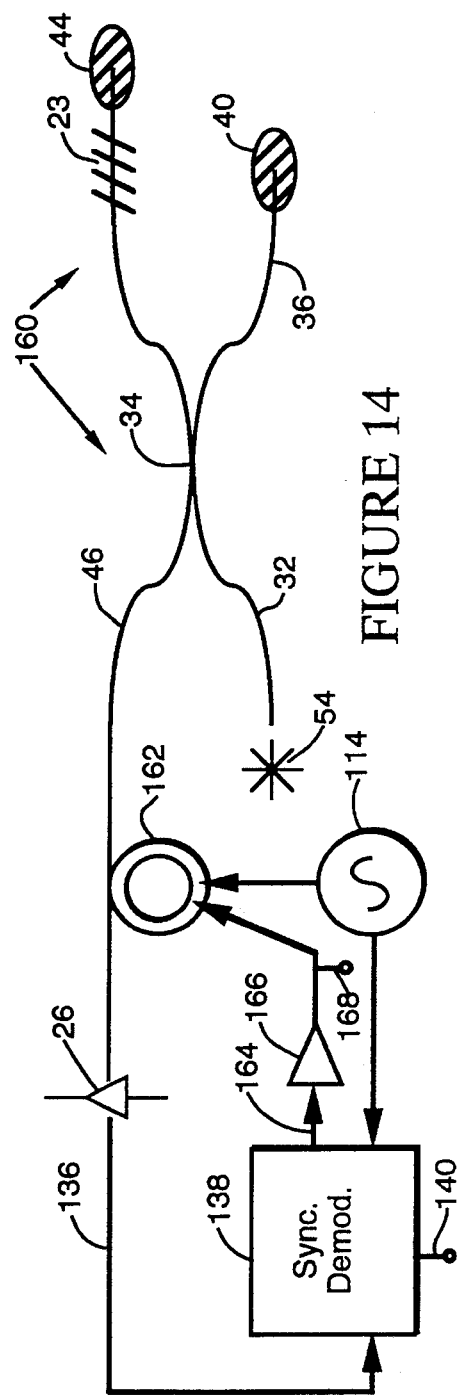

FIBER OPTIC GRATING SENSOR SYSTEMS FOR SENSING ENVIRONMENTAL EFFECTS

This invention was conceived under DARPA Contract MDA 972-90-C-0026. The Government of the United States of America has a paid up, royalty free license to practice the invention and have the invention practiced for U.S. Government purposes.

BACKGROUND OF THE INVENTION

There is a need for highly accurate and responsive environmental sensor systems that are low in weight, non-obtrusive, economical to manufacture and able to withstand harsh environments. Typical applications in need of such sensor systems are smart skins for aircraft and smart supporting structures for space stations. Such structures must be able to provide continuous indications of their physical state in real time, be extremely hardy and long lasting, be able to detect small changes over a large area of structure and have a large dynamic range, without interfering with other functions within the structure.

Intra-core fiber gratings have been proposed for fiber optic sensors. These fiber gratings are constructed by doping an optical fiber with material such as germania. The side of the fiber is then exposed to an interference pattern of radiation to produce multiple variations in the refractive index within the fiber that are very closely and accurately spaced. By adjusting the fringe spacing of the interference pattern, the periodic index of refraction produced can be varied as desired.

The reflecting center wavelength of the spectral envelope of a fiber grating changes linearly with temperature and strain. For a temperature change $\Delta T$ and a strain $\epsilon$, the fractional Bragg wavelength shift is given by:

$$\frac{\Delta \lambda_g}{\lambda_g} = (\alpha + \xi)\Delta T + (1 - p_e)\epsilon$$

where $\alpha$ is the thermal expansion coefficient of the fiber, $\xi$ represents the thermal optic coefficient or $$\frac{dn}{dT}$$

of the doped silica core material and $P_e$ is the photo elastic constant. For temperature, the index change is the predominant effect, being about fifteen times greater than the expansion coefficient. As reported by W. W. Morey, *Distributed Fiber Grating Sensors*, Proceedings Of The Seventh Optical Fiber Sensors Conference, p. 285-288, Sydney, Australia, December 1990, temperature responses of fiber gratings vary with fiber type, but they have found to have been linear up to 500° C. Typical temperature responses are 0.0043 nm/° C. at 833 nm. for Andrew PM fiber and 0.0074 nm./° C. for Corning FlexCore Fiber at 824 nm. When the fiber grating is strained, the Bragg wavelength changes to photoelastically induce a change in the refractive index. For silica, the photoelastic constant is 0.22. Bragg wavelength changes under tension have been measured to 45 kpsi stress, giving a 2.3 nm. shift for a slope of $5.2 \times 10^{-4}$ nm. per microstrain at 820 nm. The fiber gratings can be used both as multiplexed distributed grating sensors, and time and frequency division multiplexed sensors, as described in W. W. Morey. However, there has been a need to integrate such fiber gratings into practical and economical sensor systems that can be manufactured using available components.

BRIEF DESCRIPTION OF THE PRESENT INVENTION

In the present invention, sensor systems are constructed using one or more fiber gratings as a remote sensor of environmental effects, primarily strain or temperature, so that the sense, magnitude and position of an environmentally induced change may be measured. Such systems may be used to support health monitoring and structural assessment systems for aircraft, spacecraft, naval vessels, buildings, bridges and other structures. They can be used to augment process control for chemical and pharmaceutical plants. They can also be used to support other fiber optic sensor systems such as those needing a very accurate spectrometer for light source stabilization.

Each of the sensor systems disclosed herein uses light from a relatively broadband light source, a remote fiber grating as the sensor, a local fiber grating and a light intensity detector. The gratings are positioned so that their instantaneous spectral envelopes are compared. The spectral envelope of the local grating is controlled, so variations in the output of the comparison indicate the environmental effect. The light from the light source can be applied to either of the gratings to establish a first spectral envelope for comparison. The comparison is accomplished by conducting the first spectral envelope to the other grating. Although the light can be conducted to the local grating first, for this discussion, the light is conducted first to the remote grating where its instantaneous characteristic spectral signature is used to reflect either a small bandwidth of light or to transmit all but the small bandwidth of light. The light thereafter has a spectral envelope characteristic of the environmental condition of the remote grating. When the remote grating is stretched or compressed, or heated or cooled, the center frequency of the spectral envelope shifts in wavelength. In the simplest embodiment, the spectral envelope is then compared to the spectral envelope of one or more local fiber gratings, whose grating spacings preferably are such that there is always some overlap with the spectral envelope of the remote grating. The output of this comparison varies with the change in the environmental effect.

In some embodiments, the local grating is modulated, such as by placing it on a piezoelectric device, driven at frequencies much higher than the frequencies of the environmental effect of interest to reduce system noise in the same frequency region as the environmental effects. The fiber grating local modulator can also have a signal representative of the environmental effect fed back thereto or to the light source to close the sensor loop. In this latter case, the signal needed to null the modulator is representative of the environmental effect.

The present systems can simultaneously and continuously monitor each of many individual sensors in a fiber optic grating sensor serial string, while providing the ability to very accurately measure both the sense and magnitude of the environmental effect on each sensor. Although in the basic systems, open loop sensing is employed, closed loop methods can be used to desensitize the system to variations in loss, such as commonly are due to connectors and other similar loss mechanisms. Since the fiber grating sensors for remote placement are constructed of optical fibers having about the diameter of a human hair, they can be embedded in composite structures or attached to the surface of metal and other types of structures without noticeable intrusion, reduction in strength or increase in weight and volume.

A normal fiber grating is sensitive to both temperature and strain. In an environment where both the temperature and the strain is changing, some means need to be employed to separate the effect of temperature from the effect strain. Usually it is possible to isolate strain in a separate sensor. Therefore, the separate sensor can determine temperature variations, which can then be mathematically eliminated from the output of the strain and temperature sensitive sensor. However, it is possible to provide a modified fiber grating sensor where two gratings are superimposed in the same length of fiber. This "double" grating is then exposed to light at different frequencies and the resultant two outputs used to determine strain and temperature variations. This "double" grating exposure method has the advantage that the same temperature and strain always exists on both superimposed gratings, whereas there is always a chance that in the two grating method, the gratings are at different temperatures or are being subjected to slightly different strain, even though they are very close to each other.

Therefore, it is an object of the present invention to provide sensor systems for smart structures using optical fiber gratings as the sensor elements.

Another object is to provide optical fiber grating sensors that can be distributed through a structure, to provide phase, amplitude and position data of environmental effects in that structure.

Another object is to provide an optical fiber grating sensor system that can be operated either open loop or closed loop.

Another object is to provide a sensor system for environmental effects, which can operate over a temperature range of more than 700° C. in extremely harsh environments.

Another object is to provide an optical sensor system with a large dynamic range.

Another object is to provide a fiber sensor that can separate the effects of strain and temperature.

Another object is to provide a fiber with multiple gratings in the same location there along.

These and other objects and advantages of the present invention will become apparent to those skilled in the art after considering the following detailed specification and the accompanying sheets of drawing wherein:

BRIEF DESCRIPTION OF THE DRAWINGS

FIG. 7 is an optical circuit diagram of a modified optical fiber grating sensor system similar to the reflection-reflection portion of FIG. 5 utilizing two local gratings for increased dynamic range and to eliminate ambiguities;

FIG. 10 is an optical circuit diagram for a modified reflection-reflection sensor system utilizing the optical fiber grating modulator of FIG. 9;

FIG. 13 is an optical circuit diagram of a reflection-transmission sensor system similar utilizing the optical fiber grating modulator of FIG. 9 and employing feedback to its light source;

FIG. 14 is an optical circuit diagram of a modified sensor system employing feedback to the local fiber grating modulation modulator thereof;

DETAILED DESCRIPTION OF THE SHOWN EMBODIMENTS

Figure 1:
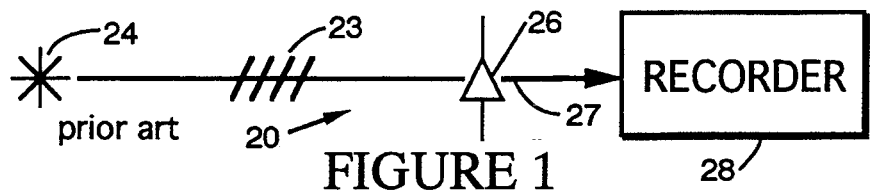
FIG. 1 is a circuit diagram of an apparatus to determine the characteristic transmission of an optical fiber grating.
Figure 2:
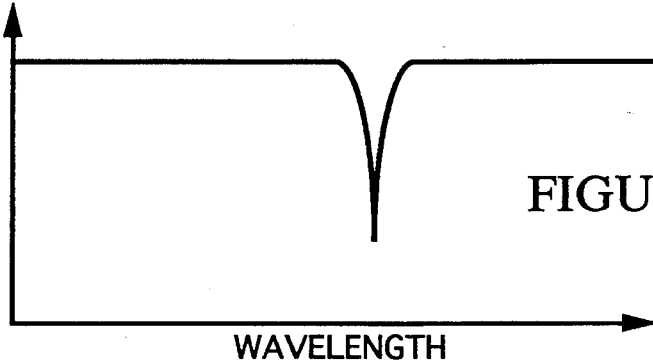
FIG. 2 is a graph of a typical output of the apparatus of FIG. 1.

Referring to the drawings more particularly by reference numbers, number 22 in FIG. 1 refers to a system to measure the spectral transmission properties of a fiber grating 23. The system 22 includes a tunable light source 24, such as a dye laser whose output light frequency can be shifted to scan the spectral response of the fiber grating 23. The fiber grating 23 contains an internal grating pattern whose spacing produces a wavelength selective reflection while allowing other frequencies of light to pass there through unimpeded, to fall on a detector 26. The detector 26 produces electrical output 27 in response to the intensity of the light thereat which is preserved by a recorder 28. The frequency response of the fiber grating 23 is indicated by an absence of light at the detector 26. A graph of typical intensity versus wavelength for the system 22 is shown in FIG. 2. It should be noted that the response of the fiber grating 23 to varying wavelengths can be relatively narrow in bandwidth.

Figure 3:
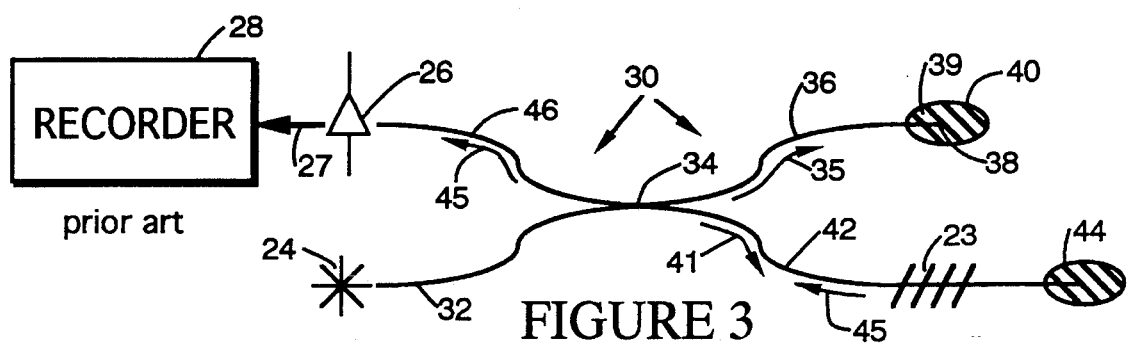
FIG. 3 is a circuit diagram of another apparatus for determining the spectral envelope characteristics of a optical fiber grating.

In FIG. 3, a system 30 is shown for measuring the reflective spectral characteristics of the fiber grating 23. In system 30, light from the tunable light source 24 is conducted by an optical fiber 32 to a fiber beamsplitter 34, where it is split into two beams. One of the beams, 35, travels on arm 36 of the splitter 34 and is absorbed at the end 38 thereof, which is terminated to avoid back reflections. Back reflections of beam 35 would degrade the accuracy of the measurements made by the system 30. A suitable termination includes crushing the end 38 and enclosing it in index matching cement 39 to form termination 40, as shown in U.S. Pat. No. 4,834,893.

Figure 4:
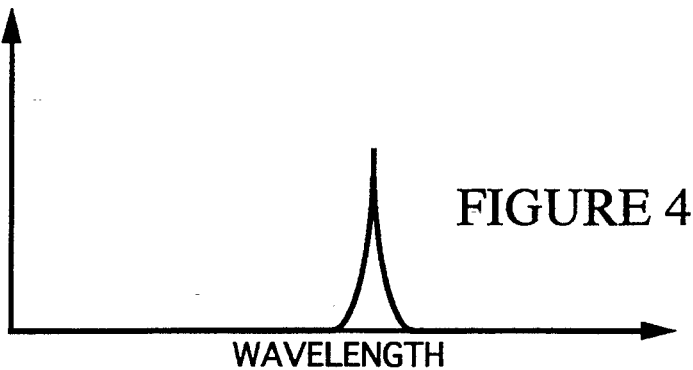
FIG. 4 is a graph of a typical reflection spectral envelope as served by the apparatus of FIG. 3.

The other beam 41 from the beamsplitter 34 is conducted to the fiber grating 23 on arm 42. Most wavelengths pass through the grating 23 and are absorbed at a second termination 44. The narrow band of wavelengths in the return beam 45 that is reflected by the fiber grating 23 when the tunable light source 24 is producing the correct frequencies, is reflected back along fiber 42, pass through the beamsplitter 34 and are conducted to the detector 26 by means of fiber arm 46. The detector 26 converts the intensity of beam 45 into electrical signals and provides them as the output 27 to the recorder 28, where they are stored. A typical spectral envelope of the reflection of the fiber grating 23 is shown in FIG. 4. The shapes of the spectral envelopes shown in FIGS. 2 and 4 are characteristic of the number of grating lines and the amount of periodic index of refraction forming them while the spacing of the grating lines within the fiber grating 23 determines the center wavelength thereof. If the fiber grating 23 is stretched or compressed, the spacing between the grating lines changes and the spectral envelope moves down or up in wavelength the, the fiber grating 23, as well as the other fiber gratings described herein, forming a tunable optical filter that reflectively separates a narrow frequency band (spectral envelope) from light otherwise passing there through. In the present invention, this phenomenon is used for environmental sensing.

Figure 5:
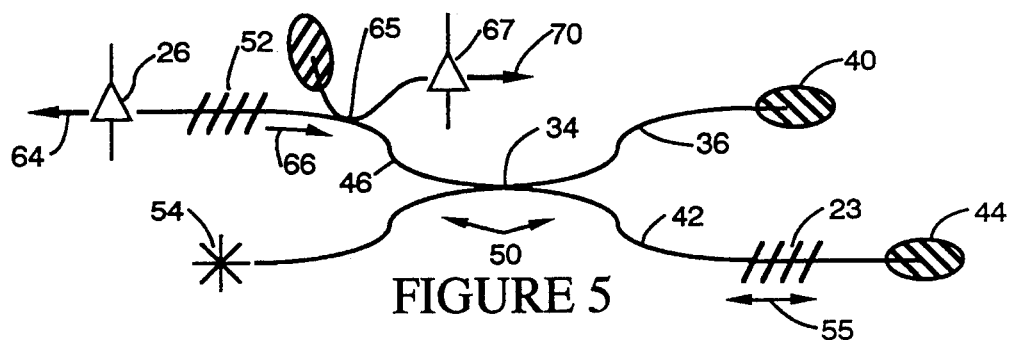
FIG. 5 is an optical circuit diagram of a sensor system constructed according to the present invention showing reflection-transmission and reflection-reflection embodiment.
Figure 6A:
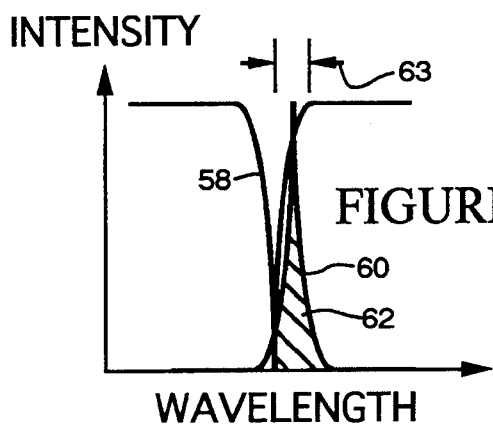
FIG. 6A is a graph of the spectral envelopes of the optical fiber gratings of the reflection-transmission portion of FIG. 5.

In many applications, such as fiber optic smart structures, it is desirable to have a sensor embedded in a part and still be able to demodulate the output thereof. The sensor system 50, shown in FIG. 5, is a modification of system 30, wherein the fiber grating 23 is used as a remote sensor. In system 50, a second fiber grating 52 is positioned between the splitter 34 and the detector 26. Light is generated by a broadband light source 54, having a bandwidth at least as wide spectrally as the spectral envelopes of the fiber gratings 23 and 52, and the spectral envelope coverage by excursions thereof due to environmental effects, shown by arrow 55. A light emitting diode is typical of those devices that can be used for light source 54. When the portion of the light output of the light source 54, characteristic of the instantaneous spacing of the grating lines of the fiber grating 23, reflects off the fiber grating 23, it passes back through the beamsplitter 34 to the grating 52. If the spacings of the gratings 23 and 52 are identical, then the amount of light reflected by grating 23 falling on the detector 26 is minimized. However, as shown in FIG. 6A, if the spectral envelope 58 of the grating 52 does not exactly coincide with the instantaneous spectral envelope 60 of the grating 23, then the intensity of the light that falls on the detector 26, shown by crosshatched area 62, is increased. If environmental effects 55 are causing the spacing of the lines of the grating 23 to vary, then those effects will cause the spectral envelope 60 to move relative to the envelope 58, shown by arrow 63, consistent with the environmental effect 55 at the grating 23, which is turn causes the output 64 of the detector 26 to vary.

Figure 6B:
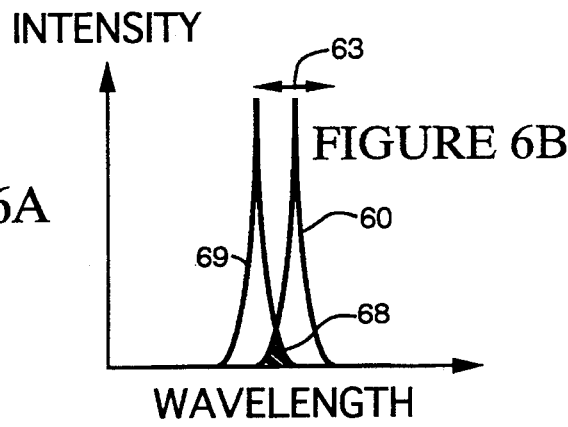
FIG. 6B is a graph of the spectral envelopes of the optical fiber gratings of the reflection-reflection portion of FIG. 5.

The output 64 of the detector 26 is not linear with variations of the environmental effect. One way to sense a more representative output is to operate both gratings 22 and 52 in their reflective modes. This can be done by placing a beamsplitter 65 in the fiber arm 46 as shown so that light 66 reflected by grating 52 falls on detector 67. The intensity of the light 66, as shown in FIG. 6B, is in proportion to the overlap 68 between the instantaneous spectral envelope 60 of grating 23 and the spectral envelope 69 of grating 52.

One disadvantage of either way of configuring the sensor system 50 is that ambiguities can arise where it is difficult to resolve whether the output 64 of the detector 26, or the output 68 of detector 67, represents a positioning of the spectral envelope 60 at a higher or lower center wavelength than the spectral envelope 58 or 69. One way to avoid this ambiguity is to design the two gratings 23 and 52 so that their spacing is different and the remote and local expected range of environmental effects cannot move the two envelopes 58 or 69, and 60 beyond exact wavelength correspondence, nor move them far enough away that the overlap 62 or 68 no longer exists and the output 64 or 70 goes to zero. It is desirable to operate the system 50 with the envelopes 58 or 69, and 60 substantially overlapped, because its sensitivity is greatly reduced as the detector output 64 or 70 approaches zero.

Figure 8A:
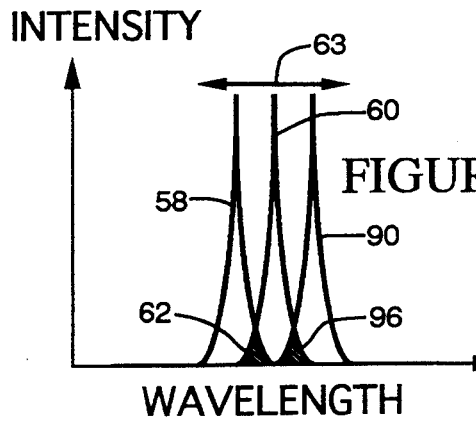
FIG. 8A is a graph of the spectral envelopes of the gratings of FIG. 7.

Another way to handle ambiguity is with the system 80 shown in FIG. 7. The system 80 has a second beamsplitter 82 connected to the fiber arm 46 so that light reflected from the remote grating 23 is split thereby, a portion 83 going by way of fiber 84 to reflect off the first local grating 52, passing through beamsplitter 65 to the detector 67, and the other portion 85 going by way of fiber 86 to reflect off a second local fiber grating 88, whose spacing is chosen so that its spectral envelope 90, as shown in FIG. 8, does not appreciably overlap the spectral envelope 58 of grating 52 nor is the spacing there between wider than the spectral envelope 60. The quiescent spacing of the lines of grating 23 is chosen so that its spectral envelope 60 generally sits between the two spectral envelopes 58 and 90. In such a case, the light 91 passing through the beamsplitter 92 and falling on a second detector 92, produces a second output 94, representative of the light intensity of the area 96, common to the spectral envelopes 60 and 90 in FIG. 8A. Therefore, movement 63 of the spectral envelope 60 due to stressing of the fiber grating 23, can be non-ambiguously determined from a center wavelength below the envelope 58, through a center wavelength between the envelopes 58 and 90 to a center wavelength above the envelope 90 by comparing the two outputs 64 and 94. As has been previously the case with the other systems 30 and 50, back reflections from the unused leg 98 of the beamsplitter 82 are prevented by a suitable termination 100.

Figure 8B:
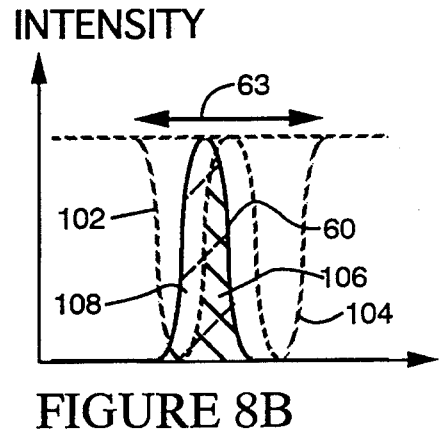
FIG. 8B is a graph if the spectral envelopes that the sensor of FIG. 7 would produce if it was configured as a reflection-transmission device with less frequency sensitive gratings.

FIG. 8B illustrates the overlap in waveforms when the system 80 is configured for transmission through the local fiber gratings 52 and 88 and the grating 23, 52 and 88 have wider frequency spectral envelope. The spectral envelopes 102 of grating 52 and the spectral envelope 104 of grating 88 are shown with their maximum spacing where they are spaced so that the outputs on the detector 67 and 93 can go up to maximum simultaneously only at a single position of the reflection spectral envelope 60 between them. As shown the reduced area 106 crosshatched with solid lines represents the output to detector 67 while detector 93 receives the maximum output 108, shown in dashed crosshatch, where envelopes 104 and 60 are completely overlapped.

Figure 9:
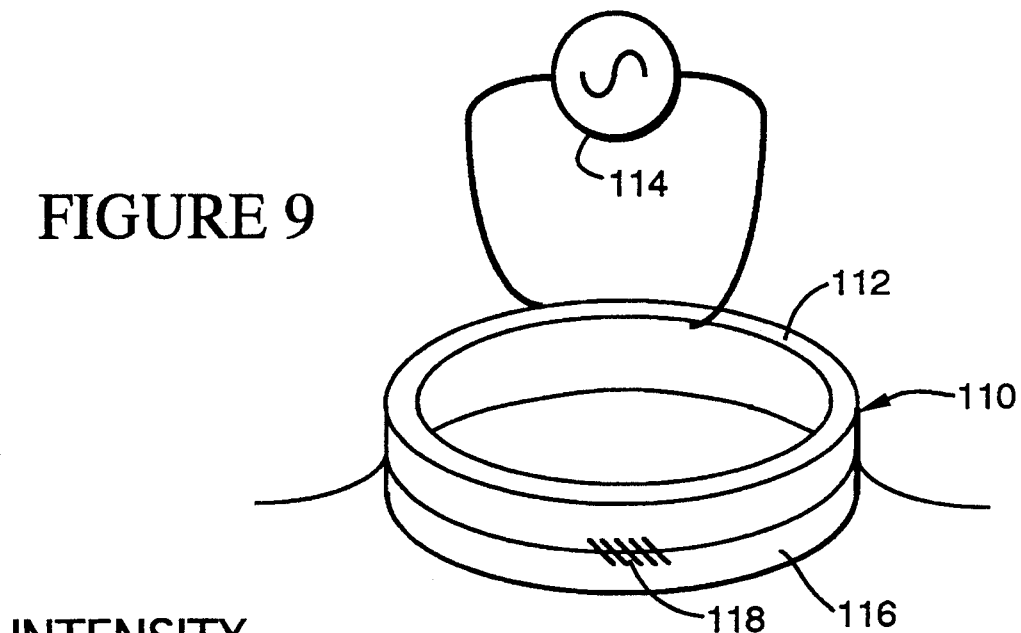
FIG. 9 is a diagrammatic perspective view of a fiber grating modulator.

The systems 30, 50, and 80 rely on DC or very low frequency measurements. To avoid noise problems, it is preferable to translate the output signals 70 and 94 to a higher frequency regime where noise can be distinguished. One way to increase the frequency is to include a fiber spectral modulator 110 (FIG. 9) or other similar device that oscillates the spectral envelope of the sensor grating 23 for demodulation purposes. The modulator 110 includes a piezoelectric mandrel 112. When oscillating voltage is applied to the mandrel 112 from a signal generator 114, it expands and contracts, changing the circumference of its outer diameter 116. By wrapping a fiber grating 118 around the mandrel 112, the expansion and contraction of the mandrel 112 modulates the spectral envelope of the fiber grating 118. The construction of piezoelectric cylinders suitable for mandrel 112 is shown in Davies et al, U.S. Pat. No. 4,002,377.

Figure 11:
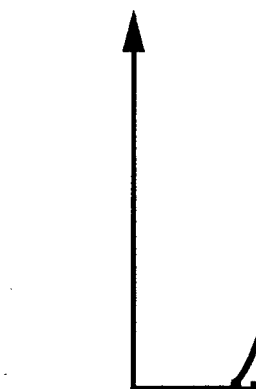
FIG. 11 is a graph of the spectral envelopes of the two fiber gratings of FIG. 10 showing the movement thereof.
Figure 12:
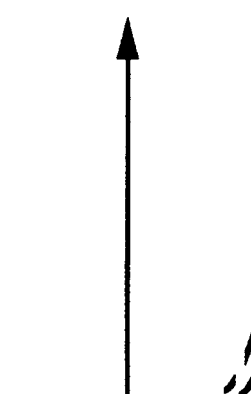
FIG. 12 is a graph of the spectral envelopes of the gratings of FIG. 10 when they are in one-to-one correspondence.

System 130 of FIG. 10 shows the modulator 110 substituted for the fiber grating 52 of system 50 to operate in an open loop configuration. In system 130, the light 131 that is reflected back by the remote fiber grating sensor 23 is reflected back by the modulator 110 to the detector 26, only when the spectral envelopes of the sensor 23 and the modulator 110 overlap. Since the modulator 110 is driven by the signal generator 114 at the frequency $\omega$, to shift the center wavelength of its spectral envelope 132 more than any expected environmental effect (FIG. 11), the spectral envelope 60 of the light 131 reflected from the remote fiber grating sensor 23 is usually offset from the spectral envelope 132 of the local fiber grating modulator 110 and moving with respect thereto. Since the fiber grating modulator spectral envelope 132 is modulated with respect to the envelope 60, the overlap region 134 is also modulated, and the net result is an amplitude modulated reflected light signal that falls on the detector 26 and is converted into an electrical signal on line 136 thereby. In particular, when the two envelopes 60 and 132 are off-set in center wavelength, the resulting signal contains the first and odd harmonics of the modulating frequency $\omega$. The amplitude of the first harmonic signal depends upon the degree of wavelength off-set. The phase of the first harmonic signal changes by 180°, dependent upon which side of the reflected signal spectrum envelope 60, the modulated spectral envelope 132 is off-set. The first harmonic signal goes to zero when the two envelopes 60 and 132 overlap, as shown in FIG. 12, and instead, second and higher order even harmonics of $\omega$ predominate. For optimal open-loop operation, the remote fiber grating 23 and the fiber grating 118 in the modulator 110 are nominally constructed to be identical so that when environmental effects 55 are not present, the first harmonic signal from the remote fiber grating 23 is zero. As the remote fiber grating 23 is stretched or compressed, the resultant direction is determinable by the phase of the output first harmonic signal and the degree of compression or stretch determined by the amplitude of the signal on line 136. This can be determined by monitoring the output of the detector 26 with a synchronous demodulator 138, to which is also fed a signal of frequency $\omega$ from the signal generator 114. The signal at the output 140 of the synchronous demodulator 138 is the open loop output of the system 130 indicative of the environmental changes occurring at the fiber grating 23.

Open loop operation of the fiber grating sensor 23 has limited dynamic range and linearity and is affected by variations in the attenuation of the various components throughout the systems 50, 80 or 130. The system 150 of FIG. 13 includes closed loop demodulation to circumvent the disadvantages of open loop operation by adding an integrator 152 connected to receive the output of the synchronous demodulator 138 and controlling the light source spectral output through current modulation. The first or a higher order odd harmonic is used as an error signal, which the integrator 152 converts into an adjustment of the current to a light source 154, whose spectrum can be biased by the voltage output of the integrator 152, which is fed thereto on line 156. The integrator 152, is adjusted to control the light source 154 so that the first harmonic signal is nulled out. Besides output 140, the output of the system 150 also can be the output 158 of the integrator voltage or other perimeters controlling the output of the light source 154 or the frequency of the light source output itself.

An alternative closed loop system 160 is shown in FIG. 14. Here the loop is closed on a two input local fiber grating modulator 162. As before, the light source 54 is a broadband light source, such as a light emitting diode, with enough spectral width to cover the sensing region of interest. The reflected spectral envelope from the remote fiber grating 23 is directed through the local grating fiber modulator 162, where it is amplitude modulated by the signal generator 114. The signal generator 114 is also connected to drive synchronous demodulator 138 at the same frequency $\omega$ as it drives the local grating modulator 162. The output of the detector 26 is fed into the synchronous demodulator 138, and the first harmonic is demodulated as an error signal. The resultant output 164 is fed to an integrator 166, which adjusts the DC voltage applied to the local fiber grating modulator 162 so that the grating thereon 162 is stretched or compressed with the stretching or compression of the remote fiber grating 23. The output 168 of the system 160 is therefore the voltage on the piezoelectric mandrel of the demodulator 162 required to match the local and remote fiber gratings 162 and 23 and represents any environmental effect at the fiber grating 23.

Figure 15:
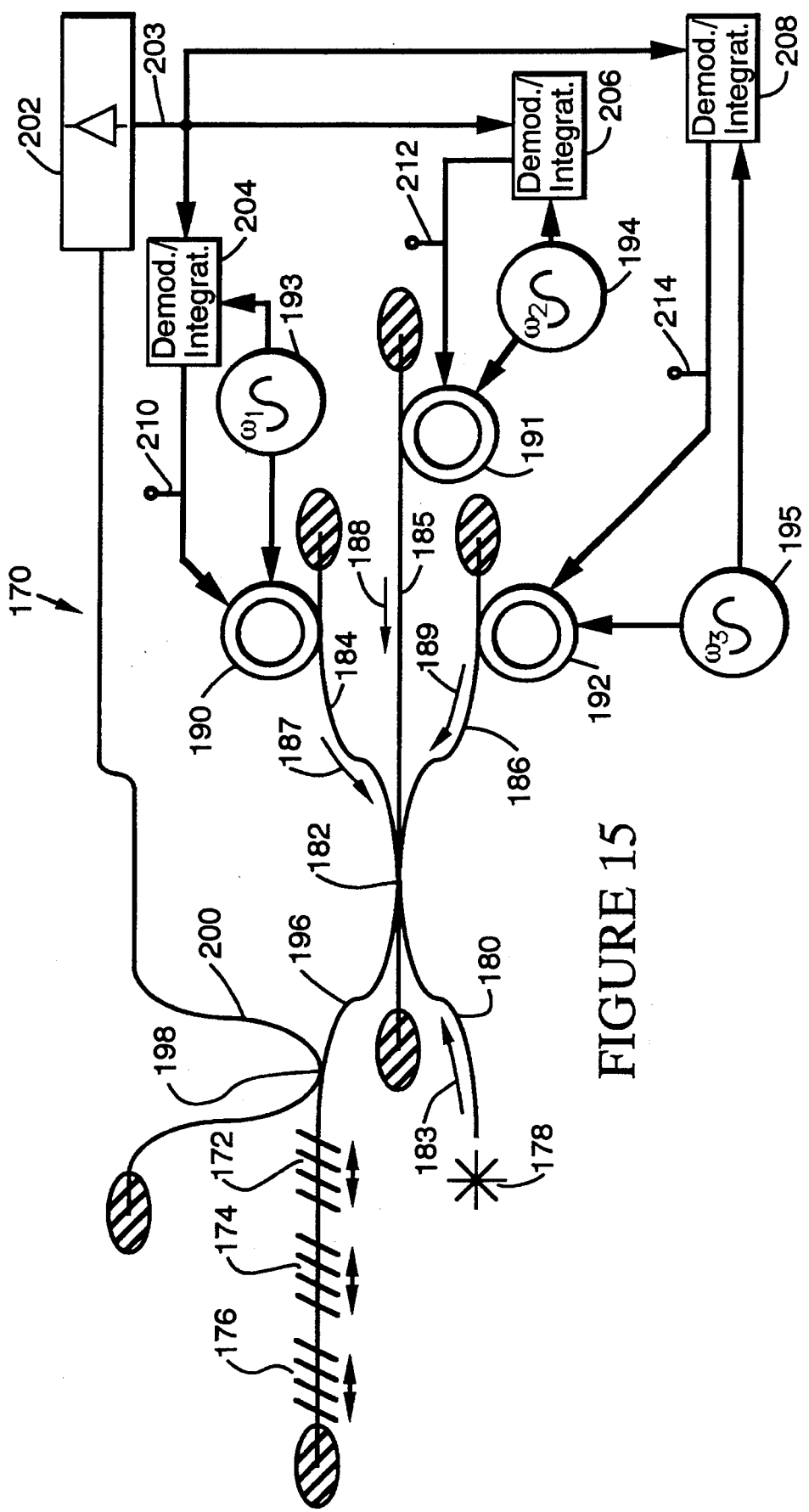
FIG. 15 is an optical circuit diagram of a reflection-reflection sensor system having multiple remote optical fiber gratings which respond at different light frequencies in their quiescent condition.

The system 170 shown in FIG. 15, multiplexes a series of remote fiber gratings 172, 174 and 176, using the closed loop techniques of system 160 and frequency division multiplexing. Preferably, the fiber gratings 172, 174 and 176 have widely spaced spectral envelopes and at the minimum are arranged so that there is no frequency overlap. In system 170, a broadband light source 178 capable of covering the desired spectral width for all the fiber grating sensors 172, 174 and 176 is used. The light from the light source 178 is coupled into one arm 180 of an n by n coupler, n equaling the number of remote fiber grating sensors, and in FIG. 15, the 3 by 3 coupler 182. The coupler 182 splits the light 183 from the source 178 into three light beams. The resultant split light beams travel on arms 184, 185 and 186 of the coupler 182 and the portions 187, 188 and 189 thereof within the instantaneous spectral envelope of local fiber grating modulators 190, 191 and 192 respectively, reflect back through the coupler 182. The local grating fiber modulators 190, 191 and 192 are operated at characteristic frequencies $\omega_1$, $\omega_2$ and $\omega_3$ by signal generators 193, 194 and 195, respectively. The light within the reflecting envelopes of the modulators 190, 191 and 192 passes through an arm 196 of the coupler 182, another coupler 198 and is selectively reflected off the remote fiber grating sensors 172, 174 and 176, dependent upon the stressed or environmental conditions thereof. The light reflecting off the grating sensors 172, 174 and 176 then passes to arm 200 of the coupler 198 positioned so that the light thereon falls on detector 202. The detector 202 produces an output on line 203 whose frequency components contain the environmental information from each sensor 172, 174 and 176. The line 203 feeds this output to synchronous demodulator/integrators 204, 206 and 208 operated at $\omega_1$, $\omega_2$ and $\omega_3$, by the signal generators 193, 194 and 195, respectively. The output from each of the synchronous demodulators/integrators 204, 206 and 208 is applied to the modulators 190, 191 and 192, respectively, to correct the voltage thereon, so that the spectral envelopes between a local fiber grating modulator and its remote fiber grating sensor overlap as in system 160 of FIG. 14. Since these voltages mimic the changes on the sensors 172, 174 and 176, the outputs on ports 210, 212 and 214 of the synchronous demodulators/integrators 204, 206 and 208 can be used as the output signals of the system 170.

Figure 16:
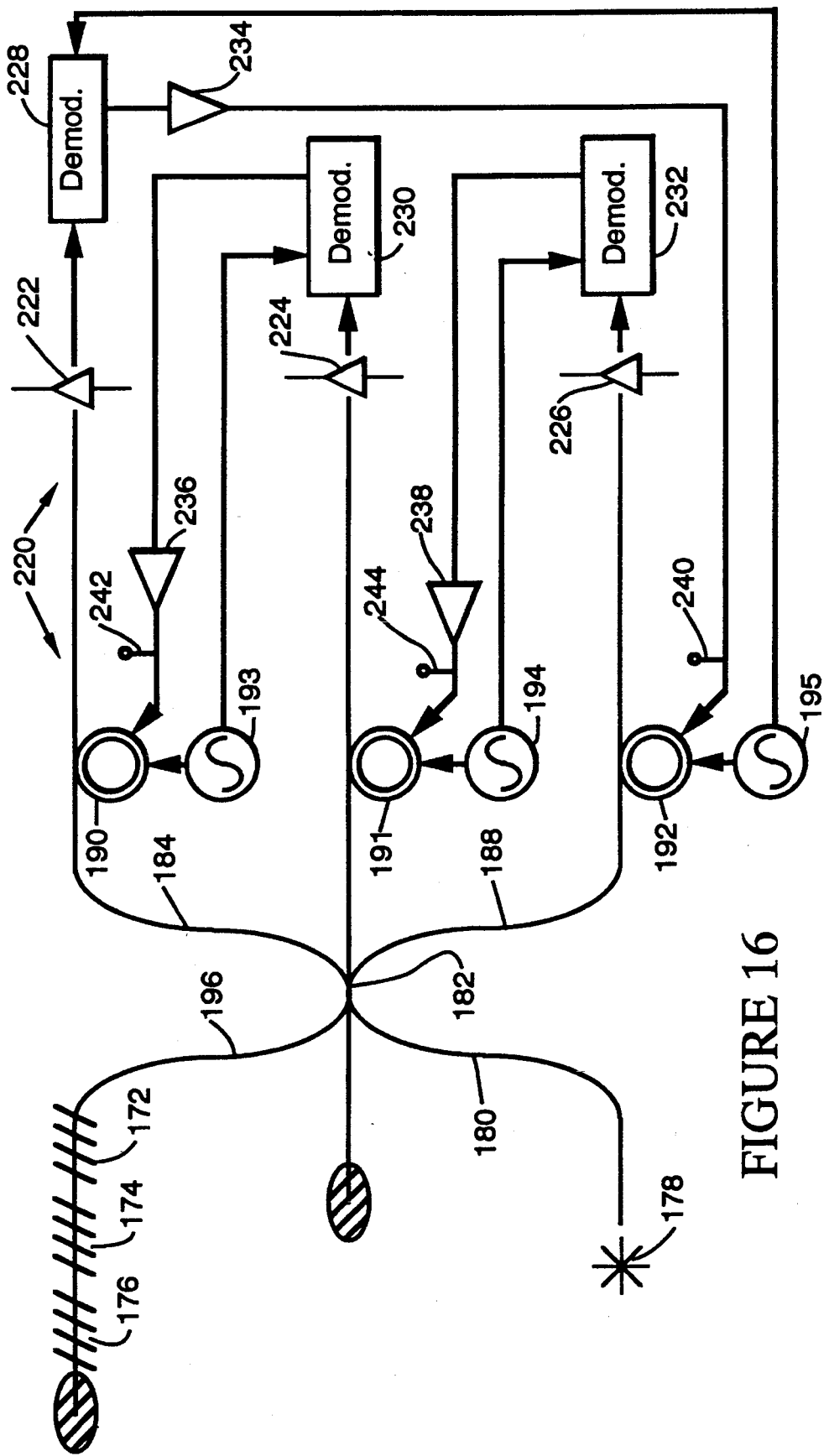
FIG. 16 is an optical circuit diagram of a closed loop multiple remote sensor system employing fiber grating modulators in both their reflective and band pass modes.

The closed loop system 220 of FIG. 16 has its detectors 222, 224 and 226 behind each of the local fiber grating modulators 190, 191 and 192, so that they pick up signals from the remote fiber gratings 172, 174 and 176, respectively, outside the wavelength filtering band of the in-line fiber grating modulators 190, 191 and 192. The outputs from the detectors 222, 224 and 226 are each fed to synchronous demodulators 228, 230 and 232, whose outputs are fed to integrators 234, 236 and 238, respectively. The output voltages from the integrators 234, 236 and 238 are fed to close the loop with other fiber grating modulators shown as 192, 190 and 191, respectively, and these voltages are taken at ports 240, 242 and 244 as outputs representative of the environmental effects on the sensors 172, 174 and 176. Another way of seeing how the system 220 operates is to consider how the environmental effects are recovered for one sensor, for example grating 172. When the local fiber grating modulator 190 reflects its spectral envelope, only a portion of the spectral envelope is going to be reflected by the sensor 172. Since the spectral envelope portion was originally created by reflection off of a local fiber grating 190, its included wavelengths are always going to be blocked thereby. The spectral envelope portion then passes through modulator 192 and falls on detector 226. The output of the detector 226 is demodulated by demodulator 232, integrated by integrator 238 and applied as nulling feedback to modulator 191 to prevent the spectral envelope portion reflected by grating 172 from passing through modulator 191. The output of the integrator 238 is available at port 244 and is representative of the environmental effects at sensor 172. Each sensor 172, 174 and 176 operates the same way, so that separate outputs are produced at each port 240, 242 and 244.

Figure 17:
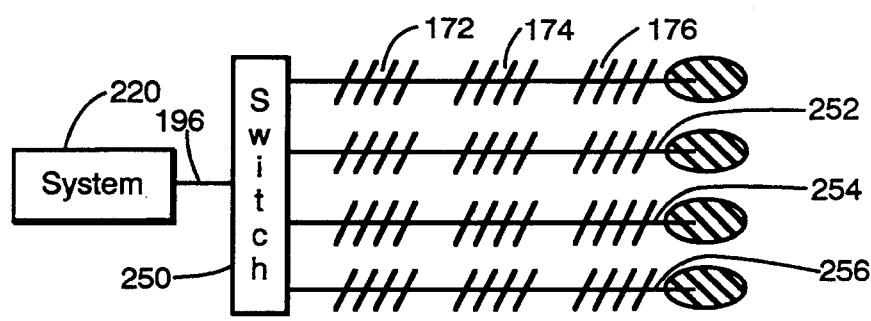
FIG. 17 is a diagrammatic view of a multiple sensor system employing a switch to change between multiple strings of optical fiber sensors.

If a switch 250 is positioned in arm 196, as shown in FIG. 17, then the system 220 can be used to support other strings 252, 254 and 256 of fiber optic grating sensors, such as sensors 172, 174 and 176. It is also possible to configure the above systems for transmission rather than reflection. However, the reflective approach has the advantage of a single point of ingress and egress.

Figure 18:
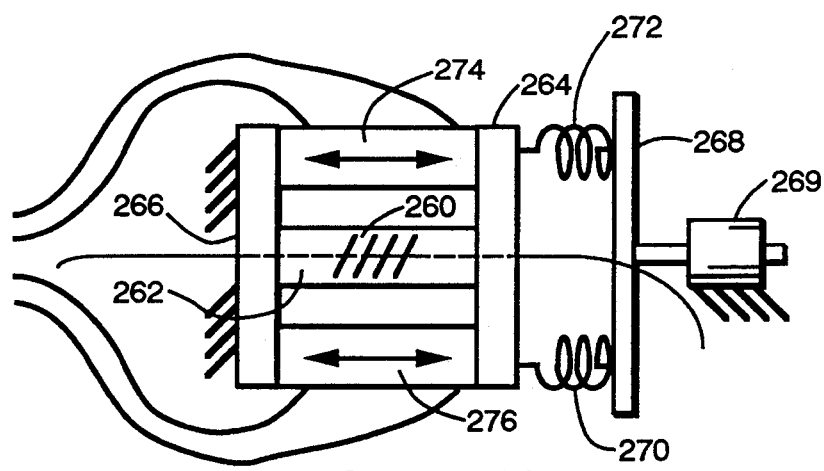
FIG. 18 is a idealized cross-sectional view of a fiber grating modulator constructed to have a wide dynamic range.

One of the issues associated with a fiber grating demodulator operating in closed loop form is that the local, controllable fiber grating must have sufficient dynamic range to match environmental effects that may be induced on the remote fiber grating sensor. For increased dynamic range, the localized fiber grating could be configured as shown in FIG. 18. Here a fiber grating 260 is embedded in an epoxy block 262, selected to match the conditions expected to be encountered by the remote fiber grating. The block 262 is then bonded to control plates 264 and 266 at least one of which, 264, is connected to the output 268 of a stepper motor 269. The output 268 is shown diagrammatically connected to the block 264 by springs 270 and 272, so that the cross members 274 and 276 can be piezoelectrically driven to produce fine control of the stressing of the grating 260, while the output 268 of the stepper motor 269 provides gross control.

Figure 19A:
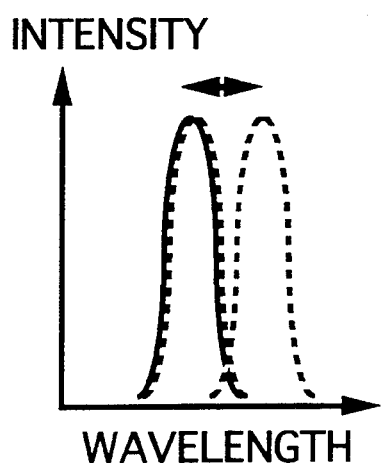
FIGS. 19A and 19B are graphs of intensity versus wavelength for optical fiber gratings having differing bandwidths.
Figure 19B:
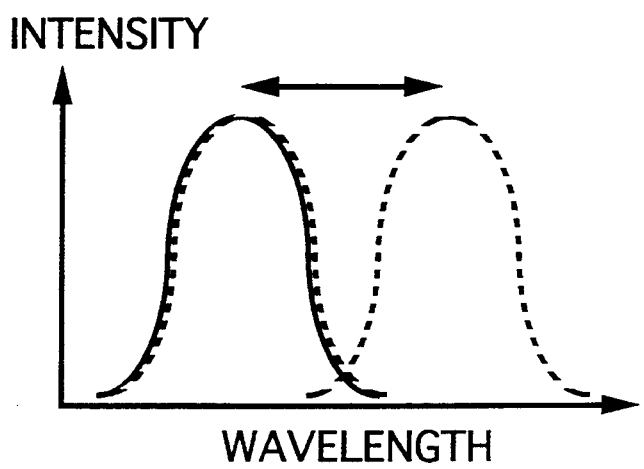

The dynamic range of each of the open loop fiber grating modulators discussed above, is limited by the spectral width of its fiber grating as shown in FIG. 19A. As an example, the typical fiber grating has a spectral coefficient of about $5 \times 10^{-4}$ nanometers per microstrain, and a spectral width of about one nanometer. A grating modulator having this fiber grating would have to have a maximum dynamic range of 2,000 microstrain and the effective dynamic range could be substantially less as the upper limit is at the point at which the signal level falls off to zero. The dynamic range can be improved by using a fiber grating with a broader spectral range, as shown in FIG. 19B, but with a loss in sensitivity.

Figures 20A, 20B, 21:
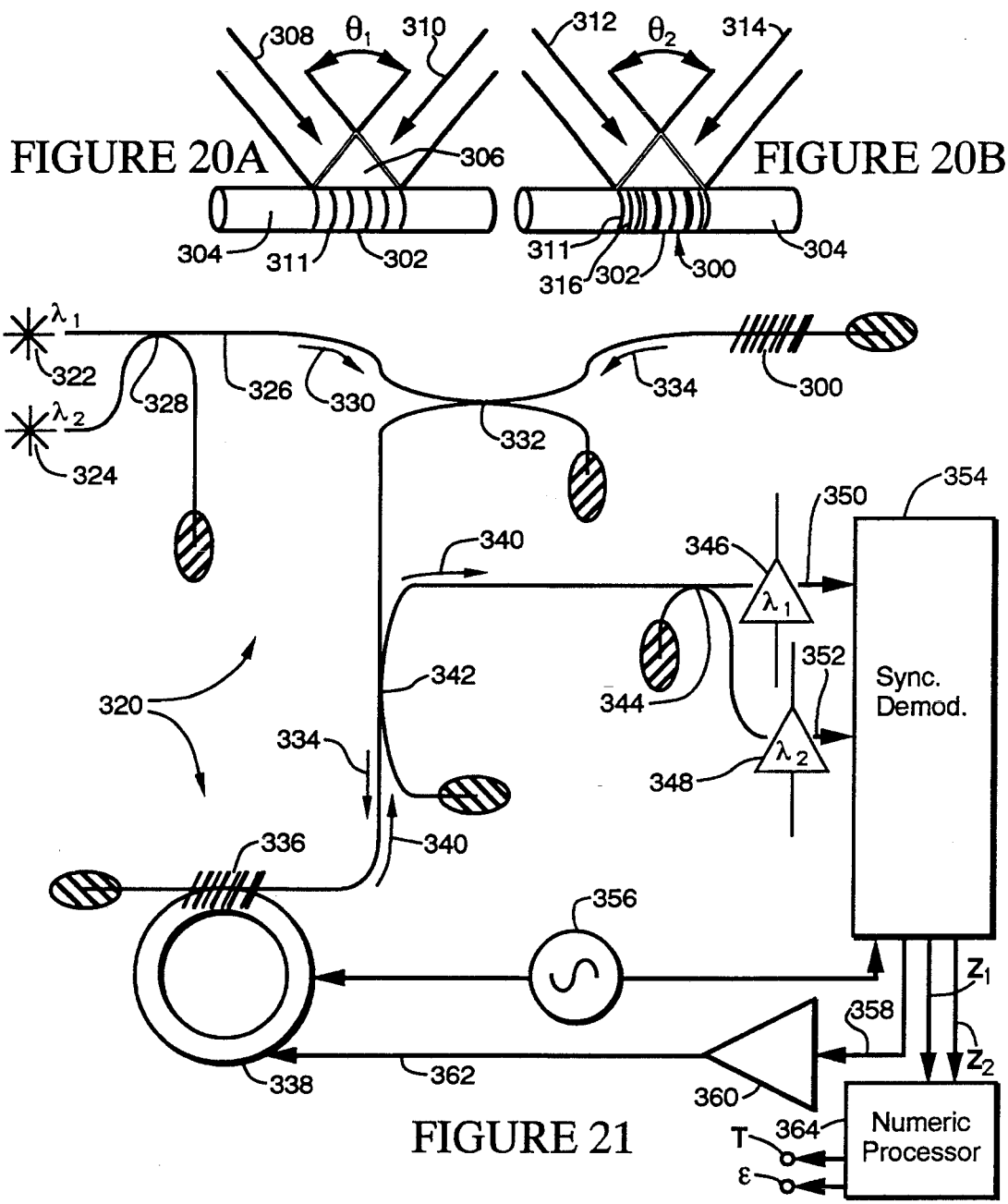
FIGS. 20A and 20B are greatly enlarged side views of an optical fiber during the formation of a double grating.
FIG. 21 is an optical circuit diagram of a closed loop remote sensor system employing double fiber gratings to simultaneously sense strain and temperature.

FIGS. 20A and 20B illustrate the construction method for producing a double grating 300 at a single location 302 on a sensitized optical fiber 304. The method is similar to the method of producing a single grating, in that the sensitized optical fiber 304 is exposed to the fringe pattern 306 of two identical frequency laser beams 308 and 310 striking the sensitized optical fiber 304 at a first angle, $\theta_1$, to form a grating 311 that reflects a first wavelength, $\lambda_1$. Thereafter the same location 302 is exposed to the interference pattern of two identical frequency laser beams 312 and 314 arraigned to strike the sensitized optical fiber 304 at a second angle, $\theta_2$, to form a second grating 316 that reflects a second wavelength $\lambda_2$. The "double" grating 300 so produced is useful in the sensor system 320 of FIG. 21, which can sense temperature and physical strain at the same location and in the same manner can provide the same result when used in the other sensor systems, described herein, modified to used light at two discrete frequency bands. Normally the beams 308, 310, 312, and 314 are all at the same frequency. However, instead of changing the angles between the beams, the frequency of beams 312 and 314 can be different from the frequency of beams 308 and 310, to produce the two different interference patterns.

The system 320 of FIG. 21 uses the double grating 300 as the remote sensor element. The system 320 has two discrete light sources 322 and 324. Light source 322 produces light having a wavelength band centered about $\lambda_1$ and light source 324 produces light having a wave length band centered about $\lambda_2$. The light from the light sources 322 and 324 is coupled onto a fiber 326 by a wavelength division multiplexing element 328, which passes light at $\lambda_1$ straight through and cross-couples light at $\lambda_2$ into the fiber 326 to produce a combined light beam 330 thereon. The light beam 330 passes through a beamsplitter 332 and two spectral envelopes are reflected by the double grating 300 dependent upon the temperature and strain thereat as light beam 334. The light beam 334 is reflected off a second double grating 336 positioned on a piezoelectric modulator 338. The resultant two spectral portions forming portions of beam 340, are conducted by beamsplitter 342 to a second wavelength division multiplexing element 344, which allows the portion of the light at $\lambda_1$ to pass straight through onto a detector 346 while cross-coupling the portion of the light at $\lambda_2$ to detector 348. In response, the detectors 346 and 348 produce outputs 350 and 352 to a dual synchronous demodulator 354. As in the previous systems, the modulator 338 and the synchronous demodulator 354 are fed the same frequency signal by a signal generator 356 which impresses the signal onto the light beam 340 and is used by the synchronous demodulator 354 to demodulate the outputs 350 and 352 into outputs $Z_1$ and $Z_2$, while producing a feed back signal 358 to a closed loop bias driver shown as integrator 360, whose output 362 is also fed to the modulator 338 as a biasing input thereto. The outputs $Z_1$ and $Z_2$ are related by:

$$Z_1 = a_1(\lambda_1)T + b_1(\lambda_1)\epsilon$$

$$Z_2 = a_2(\lambda_2)T + b_2(\lambda_2)\epsilon$$

where $a_1(\lambda_1)$, $b_1(\lambda_1)$, $a_2(\lambda_2)$, and $b_2(\lambda_2)$ are known coefficients dependent on $\lambda_1$ and $\lambda_2$, T is temperature and $\epsilon$ is strain. Therefore $$T = \frac{Z_1 b_2(\lambda_2) - Z_2 b_1(\lambda_1)}{a_1(\lambda_1) b_2(\lambda_2) - a_2(\lambda_2) b_1(\lambda_1)}$$

and $$\epsilon = \frac{Z_2 a_1(\lambda_1) - Z_1 a_2(\lambda_2)}{a_1(\lambda_1) b_2(\lambda_2) - a_2(\lambda_2) b_1(\lambda_1)}$$

This mathematical calculation is accomplished in a numeric processor 364 to produce outputs representative of the instantaneous temperature, T and strain, $\epsilon$ of the grating 300.

Figure 22:
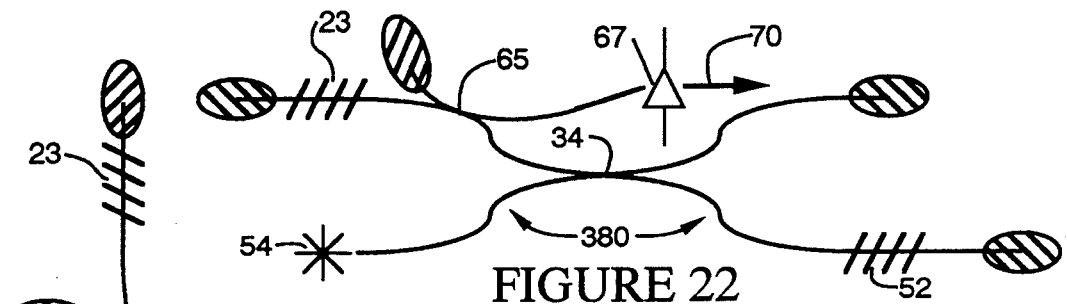
FIG. 22 is a sensor system similar to that shown in FIG. 5 with the local grating reflecting a spectral envelope to a reflecting remote grating.

FIG. 22 is a sensor system 380 similar to that shown in FIG. 5 with the positions of the remote grating 23 and local grating 52 reversed. Light from the light source 54 is conducted through the beamsplitter 34 and a spectral envelope is reflected off of grating 52 back through the beamsplitter 34 to the remote grating 23. The remote grating 23 reflects the portion of the spectral envelope of grating 52 that is common to its instantaneous spectral envelope back through beamsplitter 65 to the detector 67 to produce the output 70.

Figure 23:
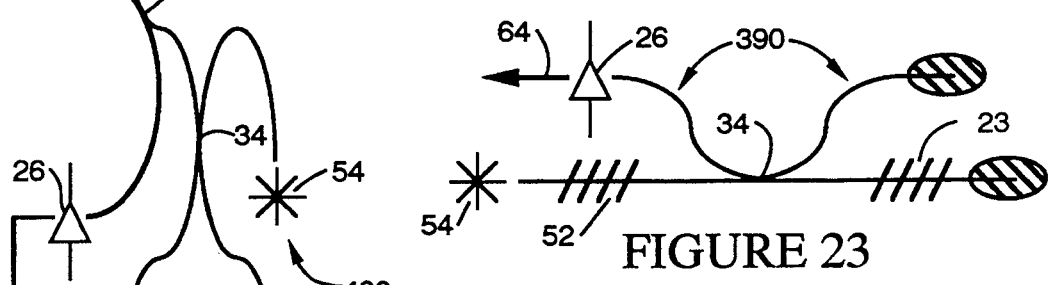
FIG. 23 is a sensor system where light is transmitted through a local grating for reflection off a remote grating.

An even simpler system 390 is shown in FIG. 23. Light from the light source 54 is transmitted through the local grating 52 to produce a spectral envelope through beamsplitter 34 to the remote fiber grating 23. The grating 23 then reflects light in the frequencies common to the transmission spectral envelope of grating 52 and the reflection spectral envelope of grating 23 back through the beamsplitter 34 to the detector 26, which produces the same output 64 as is produced in system 50 of FIG. 5.

Figure 24:
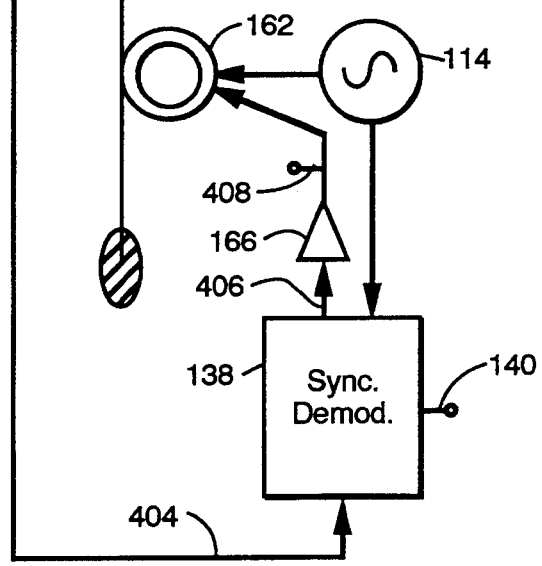
FIG. 24 is a sensor system similar to that of FIG. 14 where light is reflected off a local fiber grating modulator and then reflected off a remote fiber grating.

The sensor system 400 of FIG. 24 is similar to system 160 of FIG. 14, except that the light from the source 54 is first passed through the beamsplitter 34 to reflect a spectral envelope off of the modulator 162, which reflected spectrum then passes through beamsplitter 34 and another beamsplitter 402 to reflect a common spectral portion thereof off of the remote grating 23. The portion of the light signal that reflects from both modulator 162 and grating 23 then passes back through the beamsplitter 402 to the detector 26, which produces an output 404 to the synchronous demodulator 138. The signal generator 114, as before, is connected to drive the synchronous demodulator 138 at the same frequency, $\omega$, that it drives the local grating modulator 162. The output 404 of the detector 26 is fed to the synchronous demodulator 138 and the first harmonic is demodulated as an error signal. The resultant output 406 is fed to the integrator 166, which adjusts the DC voltage applied to the local fiber grating modulator 162, so that the grating thereon is stretched or compressed with the stretching of compressing of the remote fiber grating 23. The output 408 of the system 400 therefore is the voltage of the piezoelectric mandrel of the demodulator 162, required to match the local and remote fiber gratings 162 and 23 and represents any environmental effect at the fiber grating 23.

Figure 25:
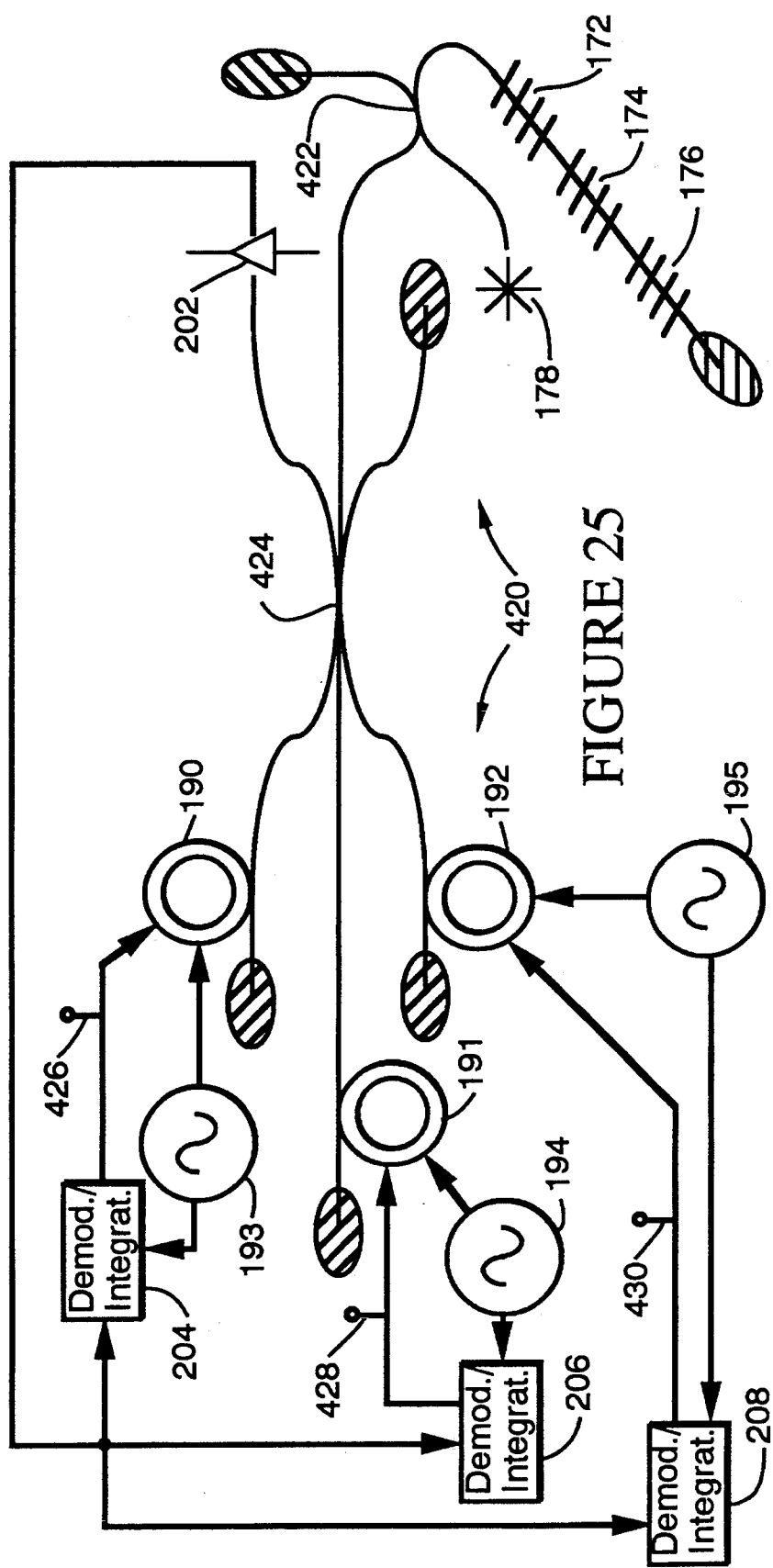
FIG. 25 is a sensor system similar to that of FIG. 15 where light is reflected off remote fiber gratings and then reflected off local fiber grating modulators.

The system 420 of FIG. 25 is similar to system 170 of FIG. 15, except that light from the light source 178 is first reflected off remote gratings 172, 174 and 176 to produce specific spectral envelopes through the beamsplitter 422 and the 3 by 3 beamsplitter 424 to the local fiber grating modulators 190, 191 and 192, wherein the overlapping portions are reflected back to the detector 202. Otherwise, system 420 operates essentially the same as system 170, producing outputs 426, 428 and 430 representative of the environmental effects at the remote gratings 172, 174 and 176 from the synchronous demodulators 204, 206 and 208, respectively.

Figure 26:
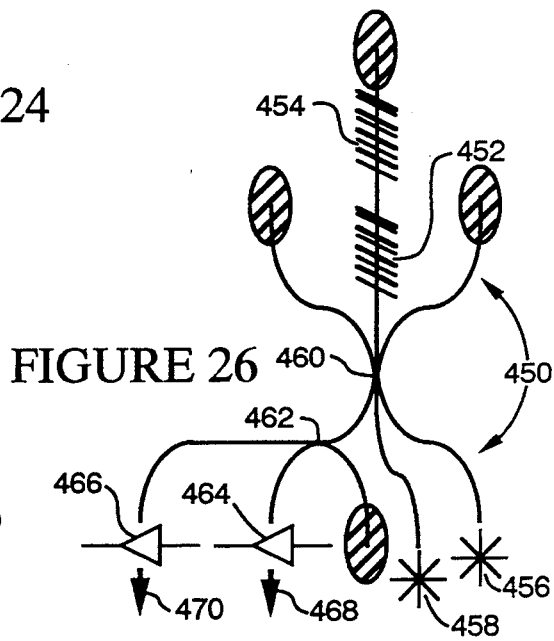
FIG. 26 is a differential sensor system where two gratings are exposed to environmental effects at different locations and the difference in environmental effects are sensed.

The system 450 shown in FIG. 26 is a differential sensor system where both gratings 452 and 454 thereof are exposed to environmental effects. The gratings 452 and 454 are shown as double gratings for illustrative purposes and could be single gratings in applications where they are exposed to strain or temperature. The gratings 452 and 454 may be identical if only the knowledge of a difference in environmental effects is to be sensed, or they may be constructed with slight differences in spectral envelopes if the direction of any difference is to be detected. Like in system 320, light in two frequency bands is produced by light sources 456 and 458. The light is combined by a 3 by 3 beamsplitter 460 and transmitted to the double grating 452 which reflects two narrow spectral envelopes back through the beamsplitter 460 to a wavelength division multiplexing element 462, which separates the two spectral envelopes for detection by detectors 464 and 466. The light that is not reflected by grating 452 passes to grating 454. If the reflection spectral envelopes of grating 454 are different than those of grating 452, then additional light is reflected back to the detectors 464 and 466 so that although light always is reaching the detectors, its intensity is double when there is no overlap between spectral envelopes with respect to the intensity when the spectral envelopes are in perfect registration. The outputs 468 and 470 from the detectors can be processed as in system 320.

Figure 27:
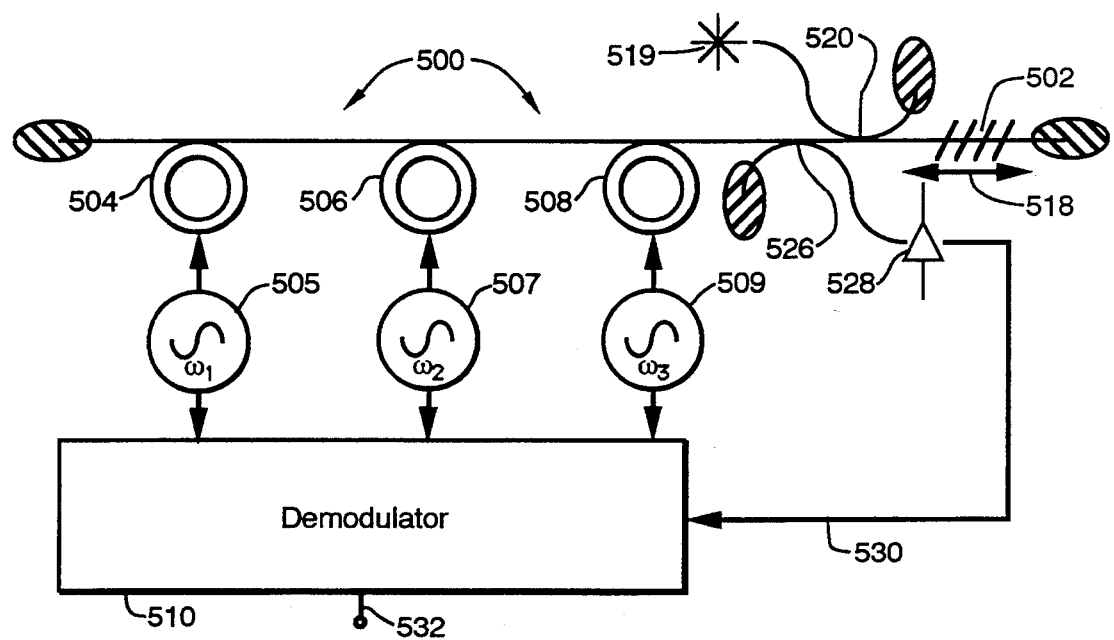
FIG. 27 is a sensor system similar to that of FIG. 10 where light is reflected off a remote fiber grating subjected to large environmental effects and then reflected off local fiber grating modulators which cover the large spectral shift of the remote fiber grating.
Figure 28:
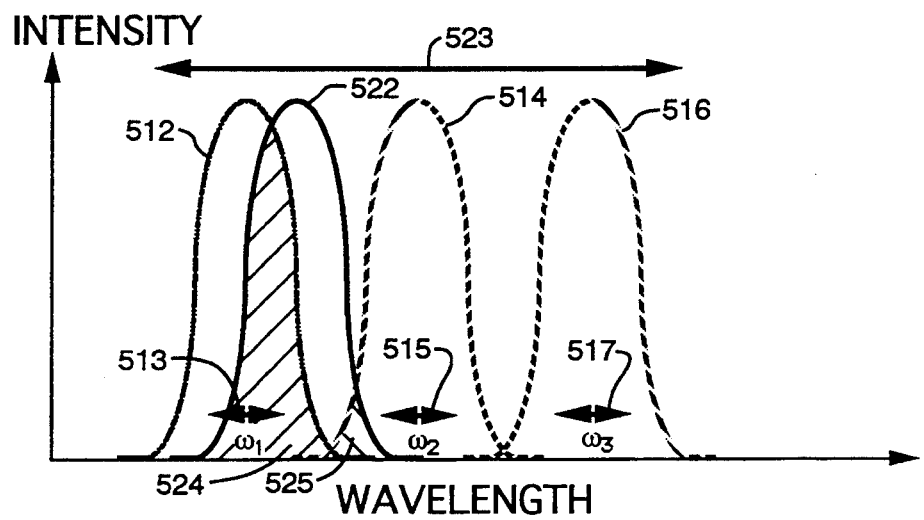
FIG. 28 is a graph of the spectral envelopes of the gratings of FIG. 27 during an instant of operation.

In some applications such as is shown with the sensor system 500 in FIG. 27, a remote fiber grating sensor 502 may be required to operate over a very wide dynamic range that is beyond the capability of a single, simple, cost effective, piezoelectric driven, fiber grating modulator 504 and signal generator 505, 506 and signal generator 507, or 508 and signal generator 509. One solution is to operate a multiple fiber grating demodulator 510 supported by the multiple fiber grating modulators 504, 506 and 508. The signal generators 505, 507, and 509 cause the fiber grating modulators 504, 506 and 508 to operate at different frequencies $\omega_1$, $\omega_2$, and $\omega_3$, but with slightly overlapping spectral envelopes as shown in FIG. 28. The reflective spectral envelope 512 produced by grating modulator 504 can vary as shown by arrow 513, the reflective spectral envelope 514 produced by grating modulator 506 can vary as shown by arrow 515, and the reflective spectral envelope 516 produced by modulator 508 can vary as shown by arrow 517. The frequencies $\omega_1$, $\omega_2$, and $\omega_3$ are generally higher than any frequency of interest in the environmental effect 518 to be sensed. However, most large amplitude environmental effects are at relatively low frequencies. Typical effects having large amplitudes include the flexing of a freeway bridge in response to heavy trucks, the movement of a high rise building in response to wind or earthquakes, and the vibration of the structure tying modules of a space station together.

In system 500, the light source 519 produces light through a beamsplitter 520 to the remote grating 502 to produce the reflective spectral envelope 522 shown in FIG. 28, whose dynamic range is shown by the arrow 523. Eventually the spectral envelope 522 will overlap all of envelopes 512, 514 and 516. Therefore, when the spectral envelope 522 passes through beamsplitters 520 and 526, the light in the spectral overlap 524 reflects off modulator 504 and the light in the spectral overlap 525 reflects off modulator 506. The light in both overlaps 524 and 525 passes through beamsplitter 526 to a detector 528. The output 530 of the detector 528 is sent to the synchronous demodulators 510, where the first and second harmonics $\omega_1$ and $2\omega_1$, $\omega_2$ and $2\omega_2$, and $\omega_3$ and $2\omega_3$ to are used to produce an output 532 indicative of the environmental effect 518 at grating 502.

The synchronous demodulators 510, determine the amplitudes of the signals $\omega_1$, $2\omega_1$, $\omega_2$, $2\omega_2$, $\omega_3$ and $2\omega_3$. By monitoring the amplitude and phase of the signals, $\omega_1$ and $2\omega_1$, $\omega_2$ and $2\omega_2$, and $\omega_3$ and $2\omega_3$, the position of the remote fiber grating spectral envelope 522 relative to each fiber grating modulator spectral envelope 512, 514, and 516 can be determined. When, as shown in FIG. 28, the spectral envelope 522 primarily overlaps the spectral envelope 512 of the remote fiber grating 504 driven at $\omega_1$, the result is that the primary signals are at $\omega_1$ and $2\omega_1$. The phase of $\omega_1$ indicates what side of the spectral envelope 512, the spectral envelope 522 of the modulator 504 is on, and the ratio between the amplitudes of the signals at $\omega_1$ and $2\omega_1$ determines its position on that side of the spectral envelope 512.

Figure 29:
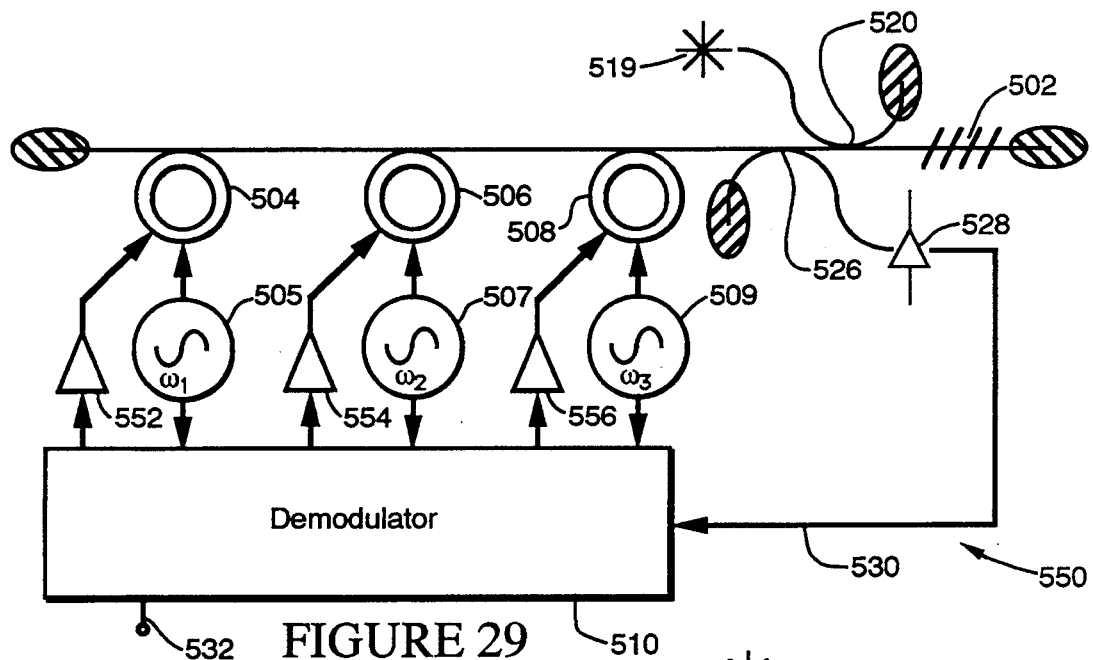
FIG. 29 is a sensor system similar to that of FIG. 27 employing integrators to close the sensor loop.

It is also possible to run system 500 as a closed loop system, as shown in system 550 of FIG. 29, wherein integrators 552, 554 and 556 are used to null out the first harmonic. Again referring to FIG. 28, the first harmonic, $\omega_1$ would be nulled out so that the spectral envelope of the fiber grating modulator 504 operating at $\omega_1$ would be overlaid with the remote fiber grating spectral envelope 522. When the limit of dynamic range of the fiber grating modulator 504 is reached, it unlocks and a hand off occurs to the spectrally adjacent fiber modulator 506 operating at $\omega_2$, and so forth.

Figure 30:
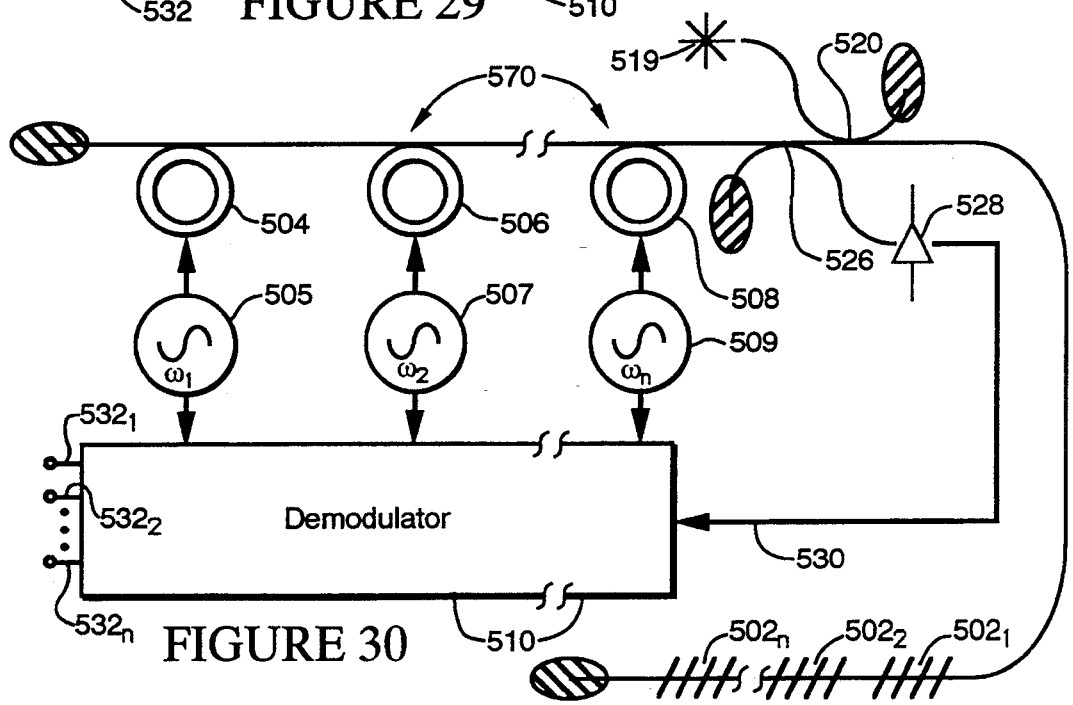
FIG. 30 is a sensor system using different remote gratings and a plurality of local modulators operating at different frequencies to sense environmental effects at different places with a minimum of components.

As shown in system 570 of FIG. 30, the technique can also be extended to cover multiplexed in-line remote fiber grating sensors $502_1$, $502_2$, . . . $502_n$ which are designed to operate about center wavelengths $\omega_1$, $\omega_2$, . . . $\omega_n$, that are spaced so that environmentally induced spectral overlap does not occur. Enough bandwidth is included between $\omega_1$ and $\omega_n$ so that all of the remote fiber gratings can produce outputs $532_1$, $532_2$ through $532_n$ representative of the environment effects thereat.

Thus there has been shown and described novel fiber grating sensor systems which fulfill all the objects and advantages sought therefor. Many changes, modifications, variations, uses and applications of the subject invention will however will become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A sensor system to sense an environmental effect, said system including:
   a light source producing a first light beam with a relatively broad band of frequencies therein;
   a first fiber grating connected to receive said first light beam and positioned for exposure to the environmental effect, said first fiber grating having:
   first periodic variations in its optical properties therealong, the instantaneous location of said first periodic variations being affectable by the environmental effect to instantaneously determine a first relatively narrow band width of frequencies reflected by said first fiber grating, said first fiber grating creating a second light beam from said first light beam whose frequency spectrum depends on the environmental effect;

a first local optical filter connected to receive at least portions of said second light beam and positioned for isolation from the environmental effect, said first local optical filter being capable of reflecting a spectrum having a relatively narrow band width overlapping at least some of the frequency spectrum of said second light beam, so that upon exposure to said second light beam, said first local optical filter creates a third light beam whose intensity is representative of the environmental effect; and first detector means positioned to receive said third light beam and to produce therefrom a first electrical output representative of the environmental effect.

2. The sensor system as defined in claim 1 wherein said second light beam is reflected from said first fiber grating, said sensor system further including:

a first beamsplitter having:
a first portion connected to receive said first light beam from said light source;
a second portion connected to said first fiber grating for conducting said first light beam to said first fiber grating; and
a third portion connected to conduct said second light beam from said second portion to said first local optical filter.

3. The sensor system as defined in claim 2 wherein said first local optical filter reflects a portion of said second light beam out of said second light beam to form said third light beam from the remainder thereof.

4. The sensor system as defined in claim 2 wherein said third light beam is that portion of said second light beam reflected by said first local optical filter, said sensor system further including:

a second beamsplitter having:
a first portion connected to receive said second light beam from said third portion of said first beamsplitter;
a second portion connected to said first fiber grating for conducting a said second light beam to said first local optical filter; and
a third portion connected to conduct said third light beam from said first local optical filter to said first detector means.

5. The sensor system as defined in claim 2 further including:

a second local optical filter having a reflective spectrum that is different than said reflective spectrum of said first local optical filter, whereby at least a portion of said reflective spectrum of said first or second local optical filter corresponds to at least a portion of said relatively narrow band width of frequencies reflected by said first fiber grating;

second detector means; and a second beamsplitter having:
a first portion connected to receive said second light beam from said third portion of said first beamsplitter;
a second portion connected for conducting a first portion of said second light beam to said first local optical filter that creates said third light beam therefrom; and
a third portion connected for conducting a second portion of said second light beam to said second local optical filter to create a fourth light beam therefrom, said first detector means being positioned to receive any portion of said third light beam that passes through said first local optical filter and to produce therefrom said first electrical output representative of at least part of the environmental effect, and said second detector means being positioned to receive any portion of said fourth light beam that passes through said second local optical filter and to produce therefrom a second electrical output representative of part of the environmental effect not represented by said first electrical output.

6. The sensor system as defined in claim 5 further including:

means to combine said first and second electrical outputs into a combined electrical output having a dynamic range greater than either of said first or second electrical outputs.

7. The sensor system as defined in claim 2 wherein said first fiber grating can be subjected a second local grating having a quiescent reflective spectrum that is different than the quiescent reflective spectrum of said first local grating;

means to vary the spacing of said first local grating at a first frequency; and means to vary the spacing of said second local grating at a second frequency, whereby at least a portion of one of said varying reflective spectrums of said first or second local grating corresponds to at least a portion of said relatively narrow band width of frequencies reflected by said first fiber grating, and wherein said first detector means includes:

synchronous demodulator means to extract said environmental effect from said third light beam.

8. The sensor system as defined in claim 2 further including:

a second local optical filter having a reflective spectrum that is different than said reflective spectrum of said first local optical filter, whereby at least a portion of said reflective spectrum of said first or second local optical filter corresponds to at least a portion of said relatively narrow band width of frequencies reflected by said first fiber grating;

second detector means;

a second beamsplitter having:
a first portion connected to receive said second light beam from said third portion of said first beamsplitter;
a second portion connected for conducting a first portion of said second light beam to said first local optical filter, whereby a portion of said first portion of said second light beam reflects from said first local optical filter to form said third light beam; and
a third portion connected for conducting a second portion of said second light beam to said second local optical filter, whereby a portion of said second portion of said second light beam reflects from said second local optical filter to form a fourth light beam;

first means to conduct said third light beam to said first detector means to produce therefrom said first electrical output representative of at least a portion of the environmental effect; and second means to conduct said third light beam to said second detector means to produce therefrom a second electrical output representative of at least a portion of the environmental effect.

9. The sensor system as defined in claim 8 further including:
means to combine said first and second electrical outputs into a combined electrical output having a dynamic range greater than either of said first or second electrical outputs.

10. The sensor system as defined in claim 8 wherein said reflective spectrum of said first local optical filter is spaced in band width from said reflective spectrum of said second local optical filter no greater than said band width of frequencies reflected by said first fiber grating.

11. The sensor system as defined in claim 1 further including:
a second fiber grating positioned for impingement by a second environmental effect; and
optical switch means to switch said first light beam between said first fiber grating and said second fiber grating, when said first light beam is switched to said second fiber grating, said second fiber grating creating a second second light beam, said second fiber grating having:
second periodic variations in its optical properties therealong, the instantaneous location of said second periodic variations being affectable by the second environmental effect to instantaneously determine a relatively narrow band width of frequencies reflected by said second fiber grating, said second fiber grating creating said second second light beam from said first light beam whose frequency spectrum depends on the second environmental effect.

12. The sensor system as defined in claim 1 wherein said first local optical filter includes:
means for varying the center frequency of the spectral envelope of said first local optical filter, said sensor system further including:
an oscillator having:
an oscillator output connected to drive said means for varying the center frequency of the spectral envelope of said first local optical filter; and
a synchronous demodulator connected to said oscillator output and said first electrical output representative of the environmental effect to produce therefrom a first sensor system output representative of the environmental effect.

13. The sensor system as defined in claim 12 wherein said oscillator output is at a relatively high frequency with respect to the environmental effect.

14. The sensor system as defined in claim 12 wherein said means for varying the center frequency of the spectral envelope of said first local optical filter include:
a piezoelectric member connected to said oscillator output, said first local optical filter being a modulator fiber grating attached to said piezoelectric member for straining thereby.

15. The sensor system as defined in claim 12 wherein said means for varying the center frequency of the spectral envelope of said first local optical filter include:
a piezoelectric member having:
a generally cylindrical outer surface, said piezoelectric member being connected to said oscillator output for driving thereby, said first local optical filter being a modulator fiber grating wrapped about said generally cylindrical outer surface for straining by variations in the diameter thereof.

16. The sensor system as defined in claim 12 wherein said first local optical filter is a modulator fiber grating and said means for varying the center frequency of the spectral envelope of said first local optical filter include:
means to strain said modulator fiber grating in steps; and
means to vary strain of said modulator fiber grating within a step.

17. The sensor system as defined in claim 12 further including:
an integrator connected to said first sensor system output representative of the environmental effect to integrate said first sensor system output into an integrated first sensor system output and connected to feed back said integrate first sensor system output to said light source.

18. The sensor system as defined in claim 12 further including:
an integrator connected to said first sensor system output representative of the environmental effect to integrate said first sensor system output into an integrated first sensor system output and connected to feed back said integrated first sensor system output to said means for varying the center frequency of the spectral envelope of said first local optical filter.

19. The sensor system as defined in claim 1 wherein said first fiber grating has:
second periodic variations in its optical properties therealong, the instantaneous location of said second periodic variations in optical properties being affectable by the environmental effect to instantaneously determine a second relatively narrow band width of frequencies reflected by said first fiber grating, said first fiber grating creating a fourth light beam from said first light beam whose frequency spectrum depends on the environmental effect, and wherein said first local optical filter is a first local grating having:
third and fourth periodic variations in its optical properties therealong, the instantaneous location of said third periodic variations determining a third relatively narrow band width of frequencies capable of being reflected by said first local grating, and the instantaneous location of said fourth periodic variations determining a fourth relatively narrow band width of frequencies capable of being reflected by said first local grating, said first local grating being connected to receive at least portions of said fourth light beam so that upon exposure to said at least portions of said fourth light beam, said first local grating creates a fifth light beam whose intensity is representative of the environmental effect.

20. The sensor system as defined in claim 1 further including:
a second light source producing a fourth light beam with a relatively broad band of frequencies therein different than the frequencies in said first light beam; and
means to combine said first and fourth light beams so that said first fiber grating receives said first and fourth light beams, said first fiber grating having:
second periodic variations in its optical properties therealong, the instantaneous location of said second periodic variations being affectable by the environmental effect to instantaneously determine a second relatively narrow band width of frequencies reflected by said first fiber grating, said first fiber grating creating a fifth light beam from said fourth light beam whose frequency spectrum depends on the environmental effect, and wherein said first local optical filter is a first local grating having:

third and fourth periodic variations in its optical properties, the instantaneous location of said third periodic variations in optical properties determining a third relatively narrow band width of frequencies capable of being reflected by said first local grating, and said fourth periodic variations in optical properties determining a fourth relatively narrow band width of frequencies capable of being reflected by said first local grating, said first local grating being connected to receive at least portions of said fifth light beam so that upon exposure to said at least portion of said fifth light beam, said first local grating creates a sixth light beam whose intensity is representative of the environmental effect, said system further including:

second detector means positioned to receive said sixth light beam and to produce therefrom a second electrical output representative of the environmental effect; and computational means to combine said first and second electrical outputs to separate two different environmental effects components therefrom.

21. A sensor system to sense at least one environmental effect, said system including:

a light source producing a first light beam with a relatively broad band of frequencies therein;

at least one first fiber grating having a first reflective spectral envelope, said at least one first fiber grating being connected to receive said first light beam and to reflect any portion of said first light beam included within said first reflective spectral envelope thereby creating a second light beam;

at least one second fiber grating having a second reflective spectral envelope, said at least one second fiber grating being connected to receive said second light beam, whereby said at least one second fiber grating reflects any portion of said second light beam within said second reflective spectral envelope thereby creating a third light beam, whereby one of said fiber gratings is exposed to the at least one environmental effect; and first detector means positioned to receive said third light beam and produce therefrom an electrical output representative of the at least one environmental effect when at least one of said fiber gratings is exposed to the at least one environmental effect.

22. The sensor system as defined in claim 21 wherein said at least one second fiber grating is exposed to a second environmental effect so that said electrical output of said first detector means is representative of the at least one environmental effect as it varies from the second environmental effect.

23. The sensor system as defined in claim 21 wherein said at least one second fiber grating is exposed to the at least one environmental effect and wherein said at least one first fiber grating includes:

means for varying the center frequency of said first reflective spectral envelope, said sensor system further including:

an oscillator having:

an oscillator output connected to drive said means for varying the center frequency of said first reflective spectral envelope; and a synchronous demodulator connected to said oscillator output and electrical output of said first detector means to produce therefrom a first sensor system output representative of the at least one environmental effect.

24. The sensor system as defined in claim 23 further including:

an integrator connected to said electrical output representative of the at least one environmental effect to integrate said electrical output representative of the at least one environmental effect into an integrated first sensor system output and connected to feed back said integrated first sensor system output to said means for varying the center frequency of said first reflective spectral envelope.

25. The sensor system as defined in claim 23 wherein said means for varying the center frequency of said first reflective spectral envelope include:

a piezoelectric member having:

a generally cylindrical outer surface, said piezoelectric member being connected to said oscillator output for driving thereby, said at least one first fiber grating being a modulator fiber grating wrapped about said generally cylindrical outer surface for straining by variations in the diameter thereof.

26. The sensor system as defined in claim 23 wherein said at least one first fiber grating is a modulator fiber grating and said means for varying the center frequency of said first reflective spectral envelope include:

means to strain said modulator fiber grating in steps; and means to vary strain of said modulator fiber grating within a step.

27. The sensor system as defined in claim 23 further including:

an integrator connected to said electrical output representative of the at least one environmental effect to integrate said first sensor system output into an integrated first sensor system output and connected to feed back said integrated first sensor system output to said light source.

28. The sensor system as defined in claim 21 wherein said at least one first fiber grating is exposed to a large environmental effect and wherein said at least one second fiber grating includes:

means for varying the center frequency of said second reflective spectral envelope at a first predetermined frequency, said sensor system further including:

a third fiber grating having a third reflective spectral envelope different than said second reflective spectral envelope, said third fiber grating being connected to receive said second light beam and including:

means for varying the center frequency of said third reflective spectral envelope at a second predetermined frequency, whereby at least one of said second or third fiber gratings reflect a portion of said second light beam thereby creating a third light beam; and synchronous demodulator means connected to said electrical output of said first detector means to produce therefrom a first sensor system output representative of the large environmental effect.

29. The sensor system as defined in claim 21 wherein said at least one first fiber grating is exposed to the at least one environmental effect and wherein said at least one second fiber grating includes:
   means for varying the center frequency of said second reflective spectral envelope, said sensor system further including:
an oscillator having:
   an oscillator output connected to drive said means for varying the center frequency of said second reflective spectral envelope; and
a synchronous demodulator connected to said oscillator output and electrical output of said first detector means to produce therefrom a first sensor system output representative of the at least one environmental effect.

30. The sensor system as defined in claim 29 wherein said oscillator output is at a higher frequency than the at least one environmental effect.

31. The sensor system as defined in claim 29 wherein said means for varying the center frequency of said second reflective spectral envelope include:
   a piezoelectric member connected to said oscillator output, said at least one second fiber grating being a modulator fiber grating attached to said piezoelectric member for straining thereby.

32. The sensor system as defined in claim 29 wherein said means for varying the center frequency of said second reflective spectral envelope include:
   a piezoelectric member having:
      a generally cylindrical outer surface, said piezoelectric member being connected to said oscillator output for driving thereby, said at least one second fiber grating being a modulator fiber grating wrapped about said generally cylindrical outer surface for straining by variations in the diameter thereof.

33. The sensor system as defined in claim 29 wherein said at least one first fiber grating is a modulator fiber grating and said means for varying the center frequency of said second reflective spectral envelope include:
   means to strain said modulator fiber grating in steps; and
   means to vary strain of said modulator fiber grating within a step.

34. The sensor system as defined in claim 29 further including:
   an integrator connected to said electrical output representative of the at least one environmental effect to integrate said first sensor system output into an integrated first sensor system output and connected to feed back said integrated first sensor system output to said light source.

35. The sensor system as defined in claim 29 further including:
   an integrator connected to said electrical output representative of the at least one environmental effect to integrate said electrical output representative of the at least one environmental effect into an integrated first sensor system output and connected to feed back said integrated first sensor system output to said means for varying the center frequency of said second reflective spectral envelope.

36. The sensor system as defined in claim 21 wherein the environmental effect is applied to said at least one second fiber grating and said least one first fiber grating is isolated from the environmental effect.

37. The sensor system as defined in claim 21 wherein the environmental effect is applied to said at least one first fiber grating and said at least one second fiber grating is isolated from the environmental effect.

38. The sensor system as defined in claim 21 further including:
   a second light source producing a fourth light beam with a relatively broad band of frequencies therein, said at least one first fiber grating having:
      first and second reflective spectral envelopes, said at least one first fiber grating being connected to receive said first and fourth light beams and to reflect any portion of said first and fourth light beams included within said first and second reflective spectral envelopes thereby creating second and fifth light beams, said at least one second fiber grating having:
      first and second reflective spectral envelopes similar to said first and second reflective spectral envelopes of said at least one first fiber grating, said at least one second fiber grating being connected to receive said second and fifth light beams, whereby said at least one second fiber grating reflects any portion of said second and fifth light beams within said first and second reflective spectral envelopes thereby creating third and sixth light beams, whereby one of said fiber gratings is exposed to at least two environmental effects; and
      second detector means positioned to receive said sixth light beam and produce therefrom an electrical output representative of the environmental effects, said electrical output representative of said first detector means also being representative of the least two environmental effects.

39. A sensor system to sense at least one environmental effect, said system including:
   light source means producing light with a relatively broad band of frequencies therein;
   fiber grating means exposed to the at least one environmental effect, said fiber grating means being capable of separating a first spectral envelope from broadband light, said first spectral envelope having:
      a first center wavelength that is determined at least in part by the at least one environmental effect and varies therewith;
   controlled means being capable of separating a second spectral envelope from broadband light, said second spectral envelope having:
      a second center wavelength controlled thereby;
   means conducting light from said light source means to said fiber grating means and to said controlled means so that said first and second spectral envelopes are mixed to produce at least one output light beam whose intensity varies with the at least one environmental effect; and
   first detector means positioned to receive said at least one output light beam and produce therefrom an output representative of the at least one environmental effect when said fiber grating means are being exposed to the at least one environmental effect.

40. The sensor system as defined in claim 39 wherein said controlled means include:
   a fiber grating isolated from the at least one environmental effect.

41. The sensor system as defined in claim 39 wherein said controlled means include:
spectral modulator means that controllably shift said second center wavelength of said second spectral envelope; and
means to produce a modulator signal indicative of the shifting of said second center wavelength of said second spectral envelope, and wherein said first detector means include:
a detector producing a detector output; and
demodulator means connected to receive said detector output and said modulator signal to produce therefrom said output representative of the at least one environmental effect.

42. The sensor system as defined in claim 39 wherein said controlled means include:
spectral modulator means capable of controllably shifting said second center wavelength of said second spectral envelope; and
signal generator means connected to said spectral modulator means and producing a modulator signal for shifting said second center wavelength of said second spectral envelope, and wherein said first detector means include:
a detector producing a detector output;
demodulator means connected to receive said detector output and said modulator signal to produce therefrom a demodulator signal; and
integrator means connected to receive said demodulator signal and to produce therefrom an integrator output connected to said spectral modulator means for shifting said second center wavelength of said second spectral envelope, said integrator output being representative of the at least one environmental effect.

43. The sensor system as defined in claim 39 wherein said controlled means include:
spectral modulator means capable of controllably shifting said second center wavelength of said second spectral envelope; and
signal generator means connected to said spectral modulator means and producing a modulator signal for shifting said second center wavelength of said second spectral envelope, and wherein said first detector means include:
a detector producing a detector output;
demodulator means connected to receive said detector output and said modulator signal to produce therefrom a demodulator signal; and
integrator means connected to receive said demodulator signal and to produce therefrom an integrator output connected to said light source means to vary the intensity of the light produced thereby, said integrator output being representative of the at least one environmental effect.

44. The sensor system as defined in claim 39 wherein said controlled means include:
means separating a plurality of spectral envelopes from broadband light;
spectral modulator means that controllably shift the center wavelengths of said plurality of spectral envelopes at different frequencies; and
means to produce modulator signals indicative of the shifting of said center wavelengths of said plurality of spectral envelopes, and wherein said first detector means include:
a detector producing detector outputs; and
demodulator means connected to receive said detector outputs and said modulator signals to produce therefrom said output representative of the at least one environmental effect.

45. The sensor system as defined in claim 44 wherein said fiber grating means include:
means to separate a plurality of first spectral envelopes from broadband light, each first spectral envelope having:
a first center wavelength different from said other first center wavelengths.

46. The sensor system as defined in claim 39 wherein said means conducting light from said light source means to said fiber grating means and to said controlled means include:
at least a first fiber beamsplitter having:
a central portion having:
first and second sides;
a first arm;
a second arm;
a third arm; and
a fourth arm, said light source means producing said light with a relatively broad band of frequencies into said first arm, said controlled means being connected to said second arm, and said fiber grating means being connected to said third arm.

47. The sensor system as defined in claim 46 wherein said first and second arms are located on said first side of said central portion and said third and fourth arms are located on said second side of said central portion.

48. The sensor system as defined in claim 47 wherein said first spectral envelope is reflected from said fiber grating means.

49. The sensor system as defined in claim 47 wherein said first spectral envelope is reflected from said fiber grating means and said second spectral envelope is reflected from said controlled means.

50. The sensor system as defined in claim 46 wherein said first and third arms are located on said first side of said central portion and said second and fourth arms are located on said second side of said central portion.

51. The sensor system as defined in claim 50 wherein said first spectral envelope is reflected from said fiber grating means.

52. The sensor system as defined in claim 50 wherein said first spectral envelope is reflected from said fiber grating means and said second spectral envelope is reflected from said controlled means.

53. The sensor system as defined in claim 39 wherein said first and second spectral envelopes each has a relatively narrow band width, said light with a relatively broad band of frequencies therein having a band width at least large enough to include said first and second spectral envelopes.

54. The sensor system as defined in claim 39 wherein said fiber grating means include:
a first fiber grating exposed to a first environmental effect, said first fiber grating being capable of separating said first spectral envelope from light from said light source means, said first center wavelength being determined at least in part by the first environmental effect;
a second fiber grating exposed to a second environmental effect, said second fiber grating being capable of separating:

a third spectral envelope from light from said light source means, said third spectral envelope having:
  a third center wavelength that is determined at least in part by the second environmental effect;
a third fiber grating exposed to a third environmental effect, said third fiber grating being capable of separating:
  a fourth spectral envelope from light from said light source means, said fourth spectral envelope having:
    a fourth center wavelength that is determined at least in part by the third environmental effect, said first, second, and third fiber gratings being connected serially together, wherein said controlled means are first controlled means capable of separating said second spectral envelope from light from said light source means, said sensor system further including:
second controlled means being capable of separating:
  a fifth spectral envelope from light from said light source means, said fifth spectral envelope having:
    a fifth center wavelength controlled thereby; and
third controlled means being capable of separating:
  a sixth spectral envelope from light from said light source means, said sixth spectral envelope having:
    a sixth center wavelength controlled thereby, and wherein said means conducting light from said light source means to said fiber grating means and to said controlled means include:
  means conducting light from said light source means to said first fiber grating and to said first controlled means so that said first and second spectral envelopes are mixed to produce an output light beam whose intensity varies with the first environmental effect;
  means conducting light from said light source means to said second fiber grating and to said second controlled means so that said third and fifth spectral envelopes are mixed to produce an output light beam whose intensity varies with the second environmental effect; and
  means conducting light from said light source means to said third fiber grating and to said third controlled means so that said fourth and sixth spectral envelopes are mixed to produce an output light beam whose intensity varies with the third environmental effect.

55. The sensor system as defined in claim 54 wherein said output light beam whose intensity varies with the first environmental effect, said output light beam whose intensity varies with the second environmental effect, and said output light beam whose intensity varies with the third environmental effect are all conducted to said first detector means to produce an output representative of the first, second, and third environmental effects.

56. The sensor system as defined in claim 55 wherein said first controlled means include:
first spectral modulator means that produce a first modulator signal and that controllably shift said second center wavelength of said second spectral envelope;
second spectral modulator means that produce a second modulator signal and that controllably shift said fifth center wavelength of said fifth spectral envelope;
third spectral modulator means that produce a third modulator signal and that controllably shift said sixth center wavelength of said sixth spectral envelope;
first demodulator means connected to receive said first modulator signal and said output representative of the first, second, and third environmental effects and to produce therefrom a first sensor output representative of the first environmental effect;
second demodulator means connected to receive said second modulator signal and said output representative of the first, second, and third environmental effects and to produce therefrom a second sensor output representative of the second environmental effect; and
third demodulator means connected to receive said third modulator signal and said output representative of the first, second, and third environmental effects and to produce therefrom a third sensor output representative of the third environmental effect.

57. The sensor system as defined in claim 56 wherein said first sensor output is fed back to said first controlled means, wherein said second sensor output is fed back to said second controlled means, and wherein said third sensor output is fed back to said third controlled means.

58. The sensor system as defined in claim 56 wherein said first sensor output is integrated and fed back to said first controlled means, wherein said second sensor output is integrated and fed back to said second controlled means, and wherein said third sensor output is integrated and fed back to said third controlled means.

59. The sensor system as defined in claim 39 wherein said fiber grating means exposed to the at least one environmental effect include:
a first fiber grating exposed to a first environmental effect, said first fiber grating being capable of separating said first spectral envelope from light from said light source means, said first center wavelength being determined at least in part by the first environmental effect;
a second fiber grating exposed to a second environmental effect, said second fiber grating being capable of separating:
  a third spectral envelope from light from said light source means, said third spectral envelope having:
    a third center wavelength that is determined at least in part by the second environmental effect;
a third fiber grating exposed to a third environmental effect, said third fiber grating being capable of separating:
  a fourth spectral envelope from light from said light source means, said fourth spectral envelope having:
    a fourth center wavelength that is determined at least in part by the third environmental effect, said first, second, and third fiber gratings being connected serially together, wherein said controlled means is first controlled means reflecting said second spectral envelope to said first, second, and third fiber gratings so that said first and second spectral envelopes are mixed to produce intensity variations with the first environmental effect in an output light beam, said sensor system further including:

second controlled means reflecting:
  a fifth spectral envelope having:
    a fifth center wavelength controlled thereby, said second controlled means reflecting said fifth spectral envelope light from said light source means to said first, second, and third fiber gratings so that said third and fifth spectral envelopes are mixed to produce intensity variations with the second environmental effect in said output light beam; and
third controlled means reflecting:
  a sixth spectral envelope having:
    a sixth center wavelength controlled thereby, said third controlled means reflecting said sixth spectral envelope light from said light source means to said first, second, and third fiber gratings so that said fourth and sixth spectral envelopes are mixed to produce intensity variations with the third environmental effect in said output light beam, wherein said first controlled means include:
first spectral modulator means that produce a first modulator signal and that controllably shift said sixth center wavelength of said sixth spectral envelope, wherein said second controlled means include:
second spectral modulator means that produce a second modulator signal and that controllably shift said second center wavelength of said second spectral envelope, wherein said third controlled means include:
third spectral modulator means that produce a third modulator signal and that controllably shift said fifth center wavelength of said fifth spectral envelope, wherein said first detector means includes:
a first detector positioned to receive light passing through said first spectral modulator means and to produce a first detector output therefrom;
a second detector positioned to receive light passing through said second spectral modulator means and to produce a second detector output therefrom; and
a third detector positioned to receive light passing through said third spectral modulator means and to produce a third detector output therefrom, and wherein said first controlled means include:
first demodulator/integrator means connected to receive said first modulator signal and said first detector output and to produce therefrom a first sensor output representative of the third environmental effect;
second demodulator/integrator means connected to receive said second modulator signal and said second detector output and to produce therefrom a second sensor output representative of the first environmental effect; and
third demodulator/integrator means connected to receive said third modulator signal and said second detector output and to produce therefrom a third sensor output representative of the second environmental effect.

60. A sensor system to sense first and second environmental effects that occur at a single location, said system including:
light source means producing light with first and second bands of frequencies therein;
first fiber grating means exposed to the first and second environmental effects, said first fiber grating means being capable of separating:
  a first spectral envelope from said first band of light frequencies having:
    a first center wavelength that is determined in part by the first environmental effect and in part by said second environmental effect; and
  a second spectral envelope from said second band of light frequencies having:
    a second center wavelength that is determined in part by the first environmental effect and in part by said second environmental effect;
optical filter means being capable of separating:
  a third spectral envelope from said first band of light frequencies, said third spectral envelope overlapping at least a portion of said first spectral envelope and having:
    a third center wavelength; and
  a fourth spectral envelope from said second band of light frequencies, said fourth spectral envelope overlapping at least a portion of said second spectral envelope and having:
    a fourth center wavelength;
means conducting light from said light source means to said first fiber grating means and to said optical filter means so that said first and third, and second and fourth spectral envelopes are mixed to produce first and second output light beams whose intensity varies differently with the two environmental effects; and
detector means positioned to receive said first and second output light beams and to produce therefrom a first output representative of the first environmental effect and a second output representative of the second environmental effect.

61. The sensor system as defined in claim 60 wherein said first fiber grating means include:
a double fiber grating exposed to changes in the first and second environmental effects, and said optical filter means are second fiber grating means that include:
  two fiber gratings isolated from changes in the first and second environmental effects.

62. The sensor system as defined in claim 60 wherein said optical filter means include:
spectral modulator means that controllably shift said third center wavelength of said third spectral envelope and said fourth center wavelength of said fourth spectral envelope; and
means to produce a modulator signal indicative of the shifting of said third center wavelength of said third spectral envelope and the shifting of said fourth center wavelength of said fourth spectral envelope, and wherein said detector means include:
  a first detector producing a first detector output from said first light output beam;
  a second detector producing a second detector output from said second light output beam; and
demodulator means connected to receive said first and second detector outputs and said modulator signal to produce therefrom said first output representative of the first environmental effect and said second output representative of the second environmental effect.

63. The sensor system as defined in claim 60 wherein said optical filter means include:

spectral modulator means that controllably shift said third center wavelength of said third spectral envelope and said fourth center wavelength of said fourth spectral envelope; and signal generator means connected to said spectral modulator means and producing a modulator signal for shifting said third center wavelength of said third spectral envelope and shifting said fourth center wavelength of said fourth spectral envelope, and wherein said detector means include:

a first detector producing a first detector output from said first light output beam;

a second detector producing a second detector output from said second light output beam;

demodulator means connected to receive said first and second detector outputs and said modulator signal to produce therefrom first and second demodulator signals;

bias means connected to receive said first and second demodulator signals and to produce therefrom a bias output connected to said spectral modulator means for shifting said third and fourth center wavelengths of said third and fourth spectral envelopes; and processor means that receive said first and second demodulator signals and produce therefrom said first output representative of the first environmental effect and said second output representative of the second environmental effect.

64. The sensor system as defined in claim 60 wherein said optical filter means include:

spectral modulator means that controllably shift said third center wavelength of said third spectral envelope and said fourth center wavelength of said fourth spectral envelope; and signal generator means connected to said spectral modulator means and producing a modulator signal for shifting said third center wavelength of said third spectral envelope and shifting said fourth center wavelength of said fourth spectral envelope, and wherein said detector means include:

a first detector producing a first detector output from said first light output beam;

a second detector producing a second detector output from said second light output beam;

demodulator means connected to receive said first and second detector outputs and said modulator signal to produce therefrom first and second demodulator signals;

bias means connected to receive said first and second demodulator signals and to produce therefrom a bias output connected to said light source means to vary the intensity of the light produced thereby; and processor means that receive said first and second demodulator signals and produce therefrom said first output representative of the first environmental effect and said second output representative of the second environmental effect.

65. The sensor system as defined in claim 60 wherein an even number of said spectral envelopes are reflected spectral envelopes.

66. The sensor system as defined in claim 60 wherein said first and second spectral envelopes are reflected spectral envelopes.

67. The sensor system as defined in claim 60 wherein said means conducting light from said light source means to said first fiber grating means and to said optical filter means include:

a wavelength division multiplexing element having:
a first arm;
a second arm; and
a third arm, said light source means producing said light with said first band of frequencies into said first arm and producing said light with said second band of frequencies into said second arm, said first fiber grating means and said optical filter means being connected to receive light in said first and second bands of frequencies from said third arm.

68. The sensor system as defined in claim 60 wherein said detector means include:
a first detector;
a second detector; and
a wavelength division multiplexing element having:
a first arm connected to conduct said spectral envelopes from said first fiber grating means and said optical filter means;
a second arm connected to deliver said first and second spectral envelopes to said first detector; and
a third arm connected to deliver said third and fourth spectral envelopes to said second detector.

69. The sensor system as defined in claim 60 wherein said first and second spectral envelopes are reflected from said first fiber grating means and said third and fourth spectral envelopes are reflected from said optical filter means.

70. A system for sensing at least one environmental effect, said system including:

first fiber means positioned for exposed to the at least one environmental effect, said first fiber means having:
a length; and
first periodic variation in optical properties along said length thereof, said first periodic variation in optical properties being affectable by the at least one environmental effect, so said first fiber means can reflect a first spectrum of a relatively narrow group of frequencies that depends on said first periodic variation in optical properties and the at least one environmental effect, and can pass a second spectrum of a first relatively large number of frequencies from which said first spectrum is removed;

a first local optical filter isolated from direct action by the at least one environmental effect, said first local optical filter being capable of separating a third spectrum of a relatively narrow group of frequencies from a fourth spectrum of a second relatively large number of frequencies, said third spectrum overlapping at least some of said first spectrum; and first comparison means capable of comparing at least one of said first and second spectra with at least one of said third and fourth spectra, and capable of producing therefrom at least a first output representative of the at least one environmental effect.

71. The system as defined in claim 70 wherein said first local optical filter is comprised of:
second fiber means isolated from direct interaction with the at least one environmental effect having:
a length; and second periodic variation in optical properties along said length thereof capable of reflecting said third spectrum dependent on said second periodic variation and passing said fourth spectrum.

72. The system as defined in claim 71 wherein said first fiber means has:

third periodic variation in optical properties along said length, said third periodic variation being affectable by the at least one environmental effect, so said first fiber means can reflect a fifth spectrum of a relatively narrow group of frequencies that depends on said third periodic variation in optical properties and the at least one environmental effect, and can pass said second spectrum of a relatively large number of spectrum of a relatively narrow group of frequencies that depends on said third periodic variation in optical properties and the at least one environmental effect, and can pass said second spectrum of a relatively large number of frequencies from which said fifth spectrum is also removed, and wherein said second fiber means has:

fourth periodic variation in optical properties along said length thereof capable of reflecting a sixth spectrum dependent on said fourth periodic variation and passing said fourth spectrum with said sixth spectrum removed therefrom; and second comparison means capable of comparing said spectra other than spectra capable of comparison by said first comparison means and capable of producing therefrom at least a second output representative of the at least one environmental effect.

73. The system as defined in claim 72 further including:

a first light source creating light with a relatively broad band of frequencies including said first and third spectra for producing first light for transmission to said first and second fiber means;

a second light source creating light with a relatively broad band of frequencies that is different than the frequencies produced by said first light source and including said fifth and sixth spectra for producing second light for transmission to said first and second fiber means.

74. The system as defined in claim 73 wherein said first and second light sources are located closer to said second fiber means than to said first fiber means.

* * * * *